(12) United States Patent
Ezaki

(10) Patent No.: US 11,127,378 B2
(45) Date of Patent: Sep. 21, 2021

(54) DISPLAY CONTROL DEVICE AND DISPLAY CONTROL METHOD

(71) Applicant: CLARION CO., LTD., Saitama (JP)

(72) Inventor: Jitsu Ezaki, Saitama (JP)

(73) Assignee: CLARION CO., LTD., Saitama (JP)

( * ) Notice: Subject to any disclaimer, the term of this patent is extended or adjusted under 35 U.S.C. 154(b) by 0 days.

(21) Appl. No.: 16/845,794

(22) Filed: Apr. 10, 2020

(65) Prior Publication Data

US 2020/0327868 A1     Oct. 15, 2020

(30) Foreign Application Priority Data

Apr. 12, 2019   (JP) .............................. JP2019-076055

(51) Int. Cl.
*G09G 5/37*     (2006.01)
(52) U.S. Cl.
CPC ........... *G09G 5/37* (2013.01); *G09G 2354/00* (2013.01); *G09G 2380/02* (2013.01)
(58) Field of Classification Search
CPC ................. G09G 5/37; G09G 2354/00; B60K 2370/1531; B60K 2370/167; B60K 2370/52; B60K 2370/736
See application file for complete search history.

(56) References Cited

U.S. PATENT DOCUMENTS

| 9,469,195 | B1 | 10/2016 | Boss et al. | |
|---|---|---|---|---|
| 2014/0309872 | A1* | 10/2014 | Ricci | A61B 5/7405 |
| | | | | 701/36 |
| 2017/0113612 | A1* | 4/2017 | Taguchi | B60K 37/02 |
| 2018/0032300 | A1* | 2/2018 | Singh | B60Q 9/00 |

FOREIGN PATENT DOCUMENTS

| EP | 3208132 A2 * | 8/2017 | ............. B60K 35/00 |
|---|---|---|---|
| EP | 3208132 A2 | 8/2017 | |
| JP | 2015-087861 A | 5/2015 | |

OTHER PUBLICATIONS

Extended European Search Report dated Sep. 4, 2020 for European Patent Application No. 20169256.3.

\* cited by examiner

*Primary Examiner* — Jeffery A Brier
(74) *Attorney, Agent, or Firm* — Volpe Koenig

(57) ABSTRACT

Display of display objects is changed as appropriate in accordance of situation change. A display control device includes: a display control unit configured to set an arrangement region on a display region of a display and control display of at least one or more display objects arranged in the arrangement region, the arrangement region having a virtual three-or-more-dimensional coordination system; and a situation determination unit configured to determine at least one situation of environment and a user, wherein the display control unit modifies the arrangement region in accordance with change of the situation.

15 Claims, 16 Drawing Sheets

FIG.16
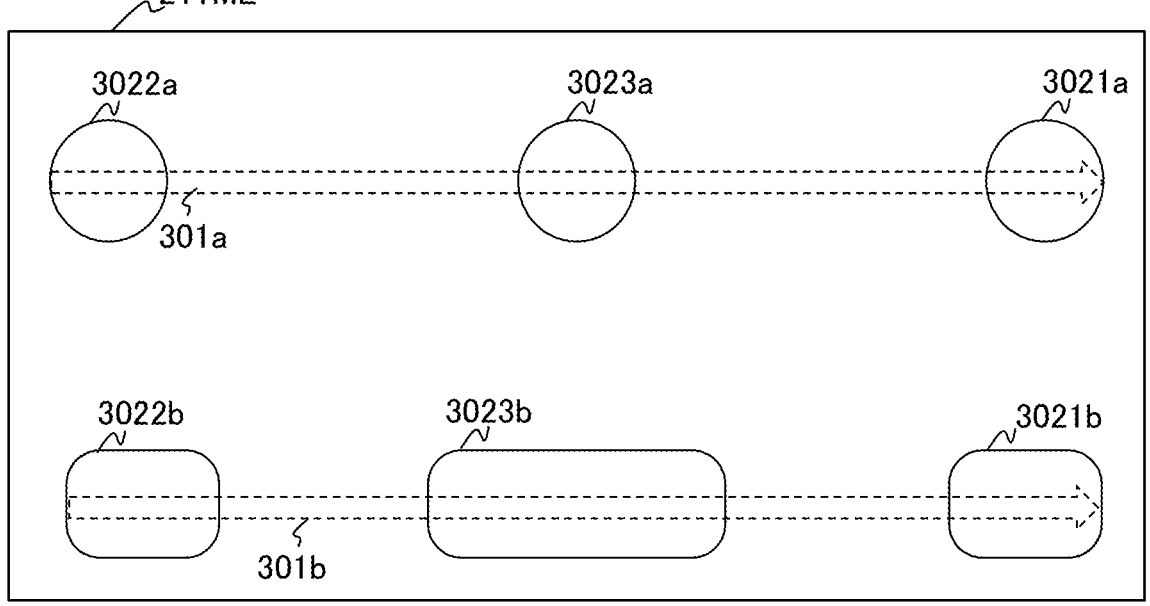
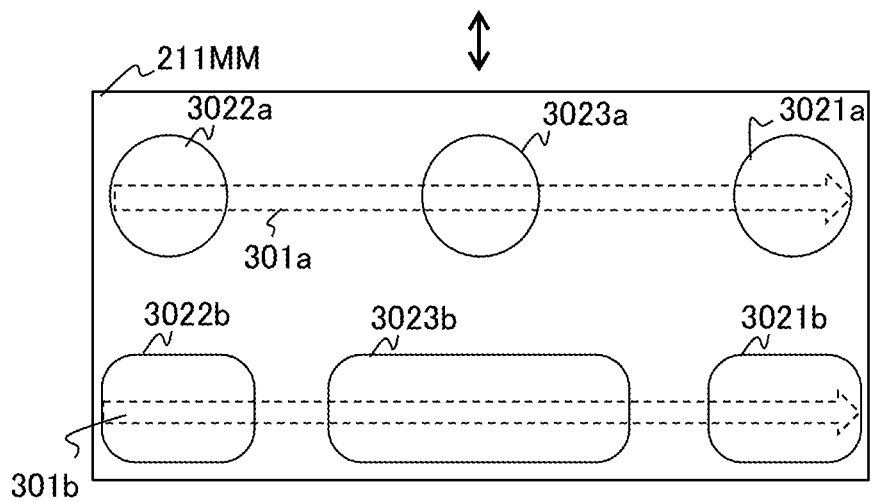
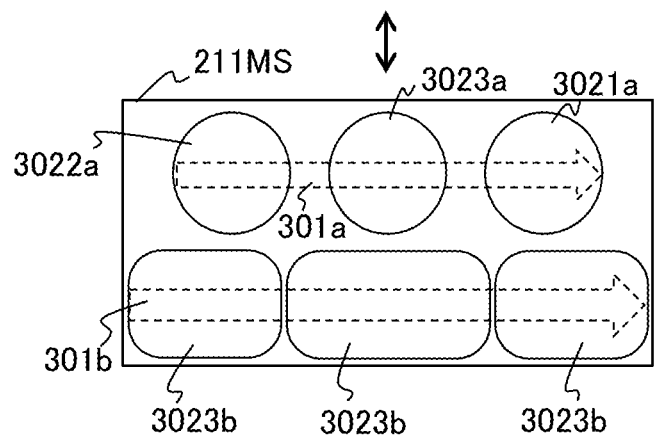

DISPLAY CONTROL DEVICE AND DISPLAY CONTROL METHOD

TECHNICAL FIELD

The present invention relates to a display control device and a display control method. This application claims the priority based on the Japanese Patent Application No. 2019-076055, filed on Apr. 12, 2019. The entire contents of which are incorporated herein by reference for all purpose.

BACKGROUND ART

As an invention relating to information display on a display, for example, JP 2015-87861 A (PTL 1) discloses an electronic device including a display unit that performs display on a display region, an operation detection unit that detects an operation with respect to the display region, and a display control unit that controls the display unit. Further, PTL 1 describes that "the display control unit has a split display mode in which a first display region included in the display region is divided into a plurality of split regions and display of each of the plurality of split regions is independently controlled. In the split display mode, the display unit is caused to display one operation target image that enables setting for each of the plurality of split regions".

PTL 1: JP 2015-87861 A

SUMMARY

As described in PTL 1, it has hitherto been possible to divide a display region into a plurality of split regions and control display of each split region independently. Specifically, when a size of the split region is changed, it is possible to simply downsize or upsize a display object such as an icon displayed on the split region, change a layout in a stepwise manner, perform trimming partially, or hide the display object. However, display change of the display object described above when the size of the split region is changed is not sufficiently in conformity with dynamic change in size of the split region. Thus, it is difficult to say that optimal display of the display object is provided.

When the display object is a human machine interface (HMI) such as an operation button displayed on the display on which a touch panel is layered, not only visibility but also operability are to be prevented from degrading. Thus, a display method of the display object can be changed preferably in accordance with environment and a situation of a user as well as the size of the split region.

The present invention has been made in view of such circumstances, and has an object to enable display of a display object to be changed more appropriately.

The present application includes a plurality of solutions to at least a part of the problems described above. One example of the solutions is as follows.

In order to solve the above-mentioned problem, a display control device according to one aspect of the present invention includes: a display control unit configured to set an arrangement region on a display region of a display and control display of at least one or more display objects arranged in the arrangement region, the arrangement region having a virtual three-or-more-dimensional coordination system; and a situation determination unit configured to determine at least one situation of environment and a user, wherein the display control unit modifies the arrangement region in accordance with change of the situation.

According to one aspect of the present invention, display of the display object can be changed more appropriately.

Note that problems, configurations, and effects other than those described above will become apparent in the following description of the embodiments.

BRIEF DESCRIPTION OF DRAWINGS

FIG. 14A is a diagram illustrating a field angle changing method, and FIG. 14B is a diagram illustrating a camera distance changing method.

FIG. 16 is a diagram illustrating other display examples of the display objects in maximum display regions in different screen sizes on the first display.

DESCRIPTION OF EMBODIMENTS

With reference to the drawings, an embodiment of the present invention is described below. Note that, in all the drawings for describing the embodiment, in principle, the identical members are denoted with the identical reference symbols, and repeated description therefor is omitted as appropriate. In the following embodiment, it goes without saying that constituent elements therein (including element steps and the like) are not necessarily essential unless otherwise particularly stated or incontrovertibly considered as essentials in principle. When the expressions "constituted of A", "being formed of A", "including A", and "comprising A" are given, it goes without saying that the expressions are not intended to exclude elements other than A unless A otherwise is clearly stated as the only element. Similarly, in the following embodiment, when shapes, positional relationships, and the like of the constituent elements and the like are referred to, substantially approximate or similar shapes and the like are included unless otherwise particularly stated or incontrovertibly considered to be different in principle or the like.

<Configuration Example of Onboard Device 10 According to One Embodiment of Present Invention>

The onboard device 10 according to one embodiment of the present invention is described below. The onboard device 10 corresponds to a display control device according to the present invention.

Figure 1:
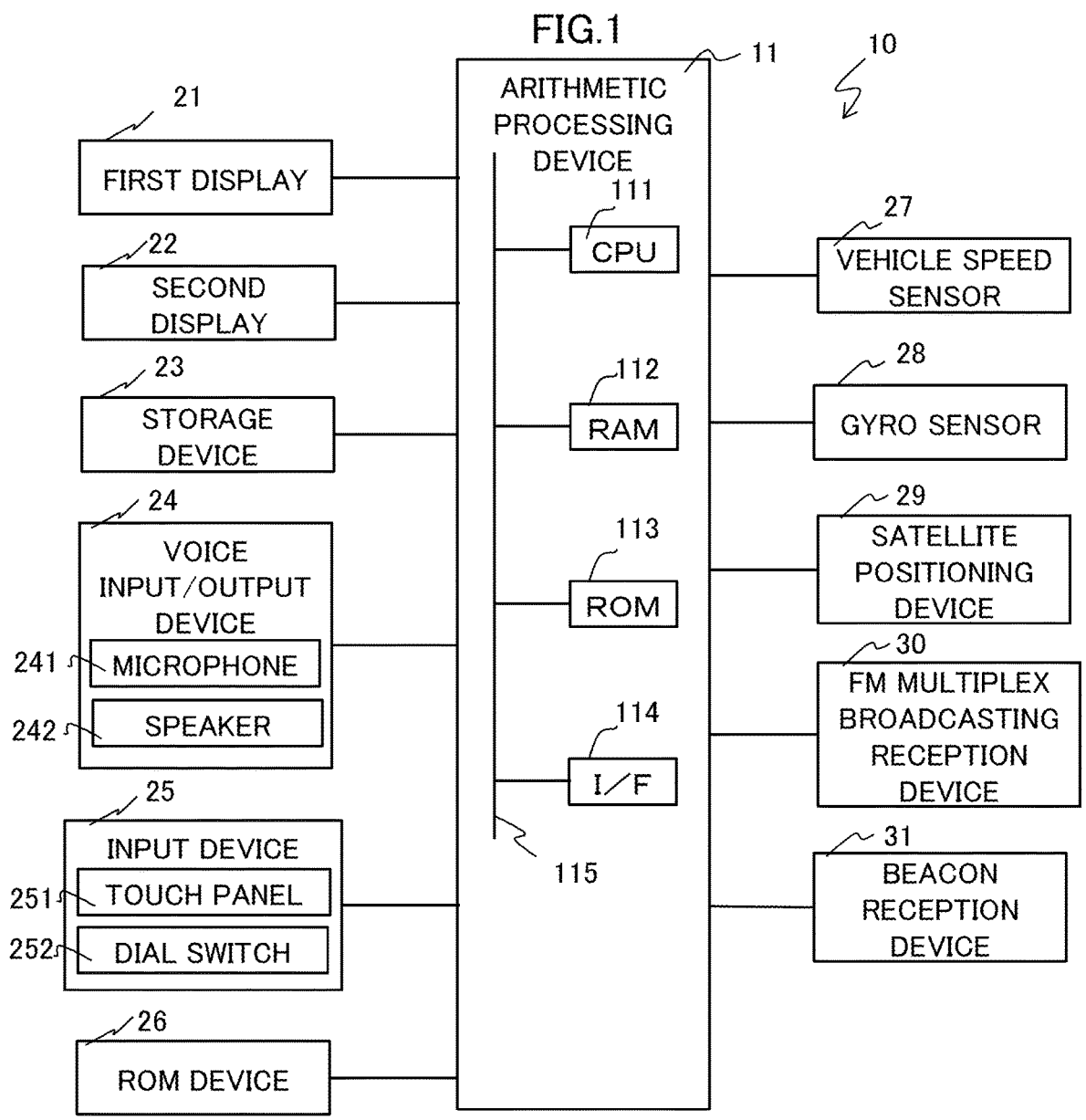
FIG. 1 is a block diagram illustrating a configuration example of an onboard device according to one embodiment of the present invention.

FIG. 1 illustrates a configuration example of the onboard device 10 according to one embodiment of the present invention. The onboard device 10 can be implemented with an onboard navigation device having a navigation function, for example. Thus, the onboard device 10 is, for example, a box-like device including a first display 21 on a front surface, and is housed in a console panel inside a vehicle. The onboard device 10 may include a mounting tool (bracket) to be mounted to the console panel, and may be mounted, for example, above the console panel inside the vehicle by the mounting tool.

Here, the navigation function refers to a function that a navigation device usually has such as displaying map information, searching for a recommended route and navigating from a departure place (or a current place) to a target place, and displaying traffic information. Note that the onboard device 10 is not limited to a dedicated navigation device, and may be, for example, a smartphone, a tablet terminal device, and a personal data assistance (PDA). In this case, the navigation function is provided by an application installed in those devices or a server device to which those devices can connect.

In addition to a navigation screen relating to the navigation function, the onboard device 10 can display an air-conditioning screen for setting a temperature, a wind direction, an air flow rate, and the like of an air-conditioner, an audio screen for selecting songs and setting a sound volume and the like of audio, a radio screen for selecting radio stations and the like, a screen of an application executed by a wirelessly connected smartphone (hereinafter, referred to as an application screen), a telephone screen for outgoing and incoming calls, a vehicle information screen for displaying various types of information and performing setting relating to a vehicle, and the like.

The onboard device 10 includes an arithmetic processing device 11, the first display 21, a second display 22, a storage device 23, a voice input/output device 24, an input device 25, and a read only memory (ROM) device 26.

Further, the onboard device 10 includes a vehicle speed sensor 27, a gyro sensor 28, a satellite positioning device 29, an FM multiplex broadcasting reception device 30, and a beacon reception device 31.

Moreover, the onboard device 10 further includes a plurality of communication I/Fs (all of them are not illustrated) such as an I/F for communicating with an external electronic device (for example, a smartphone), an I/F for communicating with a network inside a vehicle such as a controller area network (CAN), an I/F for communicating with another device inside the vehicle such as an electronic control unit (ECU) and advanced driver assistance systems (ADASs), and an I/F for communicating with a vital sensor that detects biological information of a driver.

The arithmetic processing device 11 is a central unit that performs various types of processing of the onboard device 10. As a navigation function, the arithmetic processing device 11 detects a current place through use of information output from various sensors such as the vehicle speed sensor 27 and the satellite positioning device 29, for example. Based on the acquired current place information, the arithmetic processing device 11 reads map information required for display from the storage device 23 and the ROM device 26. The arithmetic processing device 11 develops the read map information into graphics, overlaps a mark indicating the current place thereon, to generate and output an image signal to be displayed on the first display 21. The arithmetic processing device 11 calculates a recommended route connecting from a departure place and a target place that are instructed from a user (a driver or a passenger), through use of map information and the like stored in the storage device 23 or the ROM device 26. The arithmetic processing device 11 navigates along the route by outputting a predetermined signal to a speaker 242 and the first display 21.

The arithmetic processing device 11 acquires hardware information (a screen size, an aspect ratio, a resolution, and the like) from the first display 21 and the second display 22, respectively. The arithmetic processing device 11 sets a plurality of display regions on a display screen of the first display 21, and allocates various screens (the navigation screen, the air-conditioning screen, the audio screen, the application screen, the telephone screen, the vehicle information screen, and the like) to the display regions. Further, the arithmetic processing device 11 changes sizes of the display regions in accordance with an operation from a user. Moreover, the arithmetic processing device 11 further displays predetermined display objects (icons, thumbnail images, HMIs such as operation buttons, information display windows, and the like) independently in each display region in a predetermined display form. Further, the arithmetic processing device 11 displays predetermined display objects (a speed meter, a tachometer, and information windows) on the second display 22 in a predetermined shape.

The arithmetic processing device 11 as described above includes a central processing unit (CPU) 111 that executes various types of processing for performing arithmetic operations and controlling the devices, a random access memory (RAM) 112 that temporarily stores map information, arithmetic data, and the like having been read from a memory device such as the storage device 23 and a ROM 113, the ROM 113 that stores a boot program and the like executed by the CPU 111, an interface (I/F) 114 for connecting various types of hardware to the arithmetic processing device 11, and a bus 115 that connects those components to each other.

The first display 21 is installed at the center of the console panel provided on the front surface inside the vehicle, for example. The first display 21 is a unit that displays graphics information. The first display 21 is formed of a liquid crystal display, an organic EL display, or the like, for example. Note that, as described later, a transparent touch panel 251 is layered on the first display 21. Therefore, a user can perform a touch operation on (the touch panel 251 layered on) the first display 21. However, an operation on the first display 21 may also be performed through use of a dial switch 252.

The second display 22 is installed in an instrument panel provided in front of a driver's seat, for example. For example, in a case of a vehicle in which a steering wheel is installed on a left side as in a US specification vehicle, the second display 22 is set on a left side to the first display 21 installed at the center of the console panel as seen from a user.

For example, a display that displays images such as a speed meter indicating a speed of a vehicle, a tachometer indicating the number of rotation of an engine, and the like may be applied as the second display 22, or the second display 22 dedicated to the onboard device 10 may be provided. The second display 22 is a unit that displays graphics information. The second display 22 is formed of a liquid crystal display, an organic EL display, or the like, for example.

The storage device 23 is formed of a storage medium capable of reading and writing information, such as a hard disk drive (HDD) and a non-volatile memory card. Various pieces of information used by the arithmetic processing device 11 are stored in the storage device 23, for example.

The voice input/output device 24 includes a microphone 241 as a voice input device and the speaker 242 as a voice output device. The microphone 241 collects sound such as voice that is made by a driver or a passenger (user utterance) outside the onboard device 10. The speaker 242 outputs voice or sound such as route guidance and the like for a driver and the like, which is generated by the arithmetic processing device 11.

The input device 25 is a device that receives an instruction input from a user. The input device 25 includes the touch panel 251, the dial switch 252, a scroll key being another hard switch, and the like (not illustrated). The input device 25 outputs information in accordance with an operation of the keys and switches to another device such as the arithmetic processing device 11.

The touch panel 251 is formed of a transparent material, and is layered on the display screen of the first display 21. The touch panel 251 detects a touch operation by a finger of a user or a touch pen (touch-on (contact), dragging (move in a contact state), and touch-off (release of contact)). Thus, while visually recognizing the display screen of the first display 21, a user can input various operations by touching the display screen (actually, the touch panel 251). A position of a touch operation of a user is specified based on an x-y coordinate set on the touch panel 251, for example. The touch panel 251 is formed of input detection elements of a capacitive sensing type, for example.

The ROM device 26 is formed of at least a readable storage medium such as a ROM exemplified by a compact disk (CD)-ROM and a digital versatile disk (DVD)-ROM, an integrated circuit (IC) card and the like. Map information, moving image data, voice or sound data, and the like are stored in the storage medium, for example.

The vehicle speed sensor 27 is a sensor that acquires a value used for calculation of a vehicle speed. The gyro sensor 28 is a sensor that is formed of an optical fiber gyroscope, an oscillation gyroscope, or the like, and detects angular velocity of rotation of a moving body (vehicle).

The satellite positioning device 29 can measure a current place, a traveling speed, and a traveling direction of a moving body by receiving signals from artificial satellites exemplified by GPS satellites and measuring distances between the moving body and the artificial satellites and rates of change of the distances with respect to three or more artificial satellites. Those devices are used for the arithmetic processing device 11 in order to detect a current place of a vehicle to which the onboard device 10 is mounted.

The FM multiplex broadcasting reception device 30 receives FM multiplex broadcasting that is transmitted through use of an FM broadcasting wave. FM multiplex broadcasting includes an outline of current traffic information relating to vehicle-information-and-communication-system (VICS) information, regulation information, service area/parking area (SA/PA) information, parking lot information, weather information, character information as general FM multiplex information, and the like.

The beacon reception device 31 receives an outline of current traffic information relating to VICS information, regulation information, service area/parking area (SA/PA) information, parking lot information, weather information, an emergency alert, and the like. The beacon reception device 31 may be, for example, an optical beacon that performs communication through light or a radio wave beacon that performs communication through a radio wave.

Figure 2:
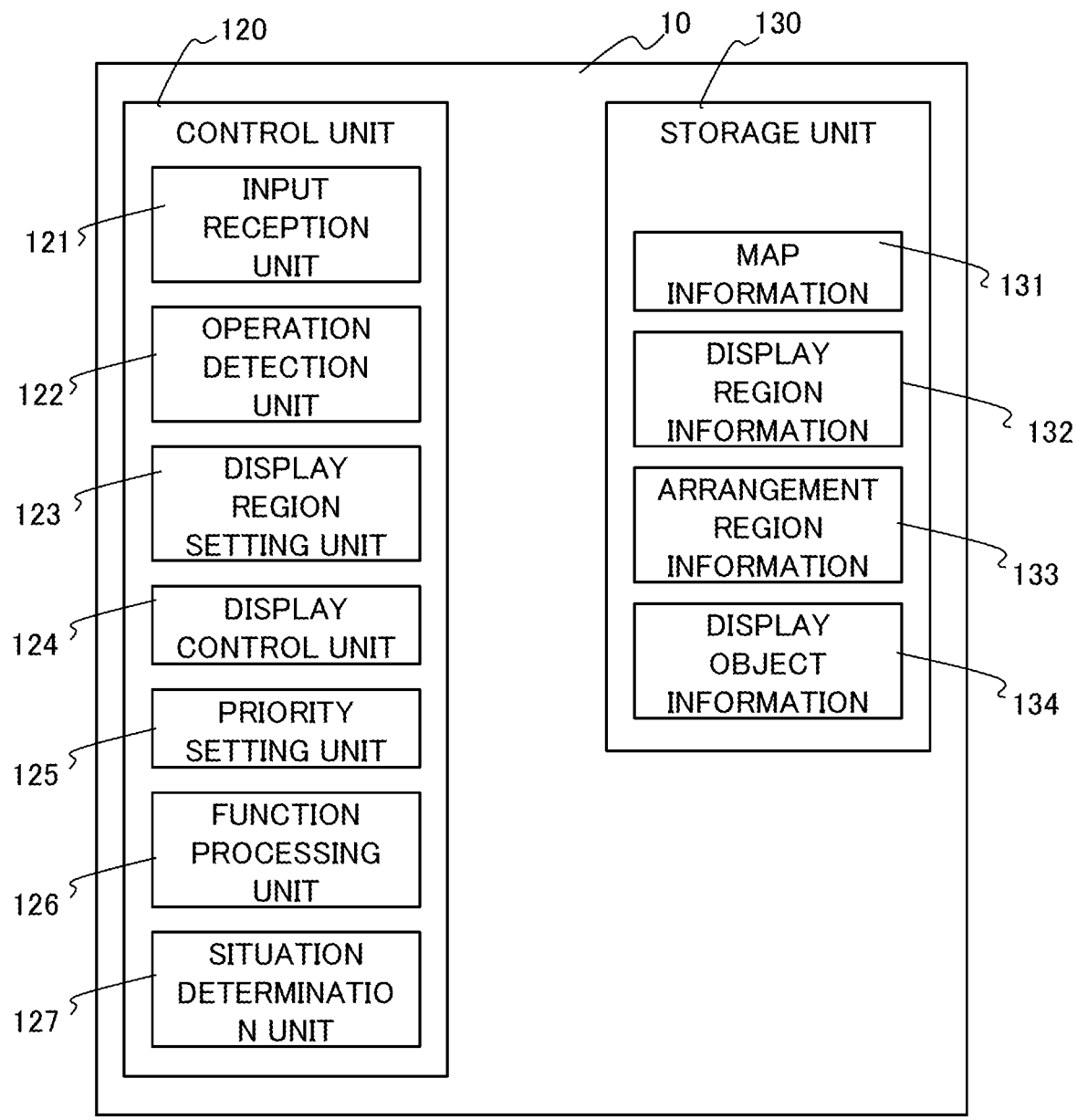
FIG. 2 is a diagram illustrating one example of a function block of the onboard device.

Next, FIG. 2 illustrates a configuration example of a function block included in the onboard device 10.

The onboard device 10 includes a control unit 120 and a storage unit 130.

The control unit 120 includes function blocks being an input reception unit 121, an operation detection unit 122, a display region setting unit 123, a display control unit 124, a priority setting unit 125, a function processing unit 126, and a situation determination unit 127.

The input reception unit 121 receives an instruction and an input of information from a user through the dial switch 252 of the input device 25 or other hard switches. For example, the input reception unit 121 receives setting of a departure place and a target place, a search instruction for a recommended route, and the like through the input device 25 from a user.

The operation detection unit 122 detects a touch operation made by a user with respect to the touch panel 251 of the input device 25. Specifically, the operation detection unit 122 detects touch-on, dragging, and touch-off with respect to the touch panel 251. The operation detection unit 122 specifies an x-y coordination on the touch panel 251 subjected to a touch operation.

The operation detection unit 122 can also detect a plurality of (for example, two) touches on the touch panel 251 within a predetermined time period (for example, 0.5 seconds), and can specify an x-y coordination on the touch panel 251 which indicates each touch position.

When detecting a touch operation (including touch-off), the operation detection unit 122 notifies the display region setting unit 123 and the function processing unit 126 of a type and an x-y coordination of the touch operation.

The display region setting unit 123 acquires hardware information (a screen size, an aspect ratio, a resolution, and the like) from the first display 21 and the second display 22, respectively, and stores the information in the storage unit

130. Note that the hardware information relating to the first display 21 and the second display 22 may be stored in the storage unit 130 in advance at the time of shipping. The display region setting unit 123 sets a display region on the display screen of the first display 21. Specifically, based on the notification from the operation detection unit 122, the display region setting unit 123 sets a division state (position and size) of a plurality of display regions obtained by dividing the display screen of the first display 21. Note that, in the present embodiment, a case where the display screen is divided into three is described, but the number of divisions may be two or four or more. The display region setting unit 123 may not divide the display screen, and display only one display region on the display screen.

The display control unit 124 controls setting of an arrangement region for each of the display regions of the first display 21 and the display region of the second display 22 and display of display objects. The display control unit 124 changes a size and a position of the arrangement region, attribute information, and the like in accordance with the change in size of the display region. The display control unit 124 changes positions of the display objects arranged in the arrangement region and attribute information in accordance with the change in size of the arrangement region.

The priority setting unit 125 sets priority with respect to the arrangement region provided in the display region and the display objects arranged in the arrangement region. The priority setting unit 125 can set an initial value determined in advance as priority with respect to the arrangement region and the display objects, and can change priority in accordance with an input from a user afterward.

The priority setting unit 125 may learn a situation where change is made to priority, and may change priority dynamically based on a learning result. Here, the situation indicates driving environment information 501 (FIG. 11) that can be acquired by the onboard device 10, such as a current place, a traveling speed, whether automatic driving is performed, types of roads during traveling, a traffic condition, a temperature, weather, time range, and the like with respect to a vehicle to which the onboard device 10 is mounted. Specifically, for example, at a predetermined time range, an arrangement region or a display object corresponding to an air-conditioning function may have high in priority.

Note that, when priority is changed, the arrangement region and the display of the display objects based on priority may be dynamically changed. The priority setting unit 125 updates arrangement region information 133 based on priority set among the arrangement regions, and updates display object information 134 based on priority set among the display objects.

The function processing unit 126 executes processing for achieving predetermined functions in accordance with a touch operation from a user with respect to a display object as an HMI displayed on the display region of the first display 21. The functions referred herein include, for example, a navigation function, an air-conditioning function, music play, selection of radio stations, outgoing and incoming telephone calls, and the like.

Based on the driving environment information 501 (FIG. 11) that can be acquired from various sensors, an ECU, an ADAS, and the like mounted on a vehicle and individual adaptation information 502 (FIG. 11) that is input from a user or detected with a vital sensor, the situation determination unit 127 determines whether to perform scaling of a display object in accordance with a situation of a vehicle or a driver (user). Further, when scaling of the display object is performed in accordance with the situation, the situation determination unit 127 determines a size of the display object.

The storage unit 130 stores predetermined information. The storage unit 130 is implemented with the storage device 23, the ROM device 26, and the ROM 113. Various types of information such as map information 131, display region information 132, the arrangement region information 133, the display object information 134, and others are stored in the storage unit 130.

Information on land forms, roads, and the like that are used for the navigation function is recorded as the map information 131.

Division states of the display regions provided on the display screen of the first display 21 are recorded as the display region information 132. A shape, a size, a position, and attribute information (including priority) of the arrangement region provided in each of the display regions of the first display 21 and the second display 22 are recorded as the arrangement region information 133. Image data and attribute information (including priority) of the displayed objects displayed on the display regions are recorded as the display object information 134.

Note that the function blocks of the onboard device 10, which are the input reception unit 121, the operation detection unit 122, the display region setting unit, the display control unit 124, the priority setting unit 125, the function processing unit 126, and the situation determination unit 127, are implemented by the CPU 111 executing predetermined programs. The programs are stored in the ROM 113 of the onboard device 10 or the storage device 23, and are loaded on the RAM 112 at the time of execution and executed by the CPU 111.

Each functional block illustrated in FIG. 2 is classified according to its main processing contents, for the sake of easier understanding of the functions of the onboard device 10 implemented in the present embodiment. Therefore, how each function is classified and referred to does not limit the present invention. Each configuration of the onboard device 10 can be classified into more components, according to the processing contents. Each configuration can be classified so that one component executes more processing.

All or a part of the function blocks may be constituted by hardware (an integrated circuit such as an ASIC, or the like) implemented in a computer. Processing of each of the function blocks may be executed by one piece of hardware, or may be executed by a plurality of pieces of hardware.

<Regarding Display Regions on Display Screen of First Display 21>

Next, display regions set on the display screen of the first display 21 are described. As described above, the onboard device causes the display region setting unit 123 to divide the display screen of the first display 21, and thus a plurality of (in the present embodiment, three) display regions 211 can be provided.

Figure 3:
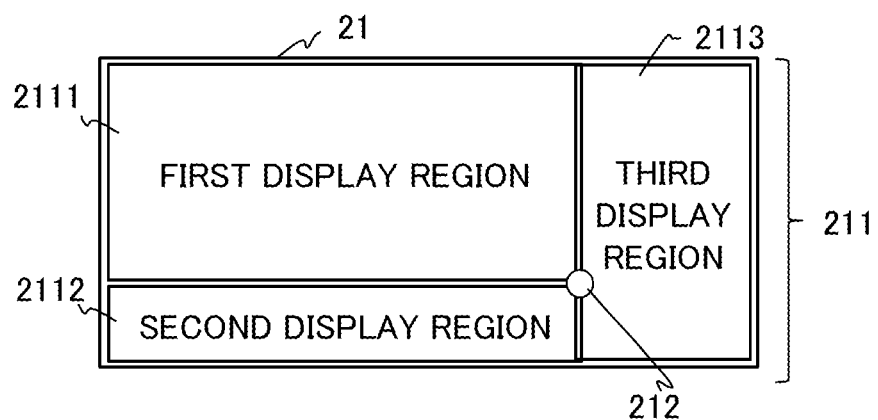
FIG. 3 is a diagram illustrating an example of a display region obtained by dividing a display screen of a first display into three.

FIG. 3 illustrates a display example of the three display regions 211 (a first display region 2111, a second display region 2112, and a third display region 2113) set on the display screen of the first display 21.

For example, the navigation screen, the air-conditioning screen, the audio screen, the radio screen, the application screen, the telephone screen, or the like can be allocated to each of the display regions 211. A plurality of operation reception buttons relating to different functions (for example, air-conditioning, audio, radio, and telephone) may be mixed and displayed on one display region 211.

When the display screen of the first display 21 is divided into the plurality of display regions 211, a pointer 212 is displayed on the display screen. When a user touches on and drags the pointer 212, the display region setting unit 123 dynamically changes a size of each of the display regions 211 on the display screen. Further, when a user touches off the pointer 212, the display region setting unit 123 confirms the size of each of the display regions 211.

However, a division state of each of the display regions 211 provided on the display screen of the first display 21 is not limited to the display example in FIG. 3, and is arbitrarily changed in accordance with an operation from a user.

An operation of a user with respect to the pointer 212 on the display screen can be received not only from the touch panel 251 but also from the dial switch 252.

<Regarding Arrangement Regions 301 Provided to Display Regions 211 of First Display 21, and Display Region 221 of Second Display 22>

Next, arrangement regions 301*a* to 301*f* that are provided on each of the display regions 211 of the first display 21 and the display region 221 of the second display 22 (FIG. 18) are described. In the following description, when there is no need to distinguish the arrangement regions 301*a* to 301*f* from each other, the arrangement region 301 is simply referred to.

Figure 4:
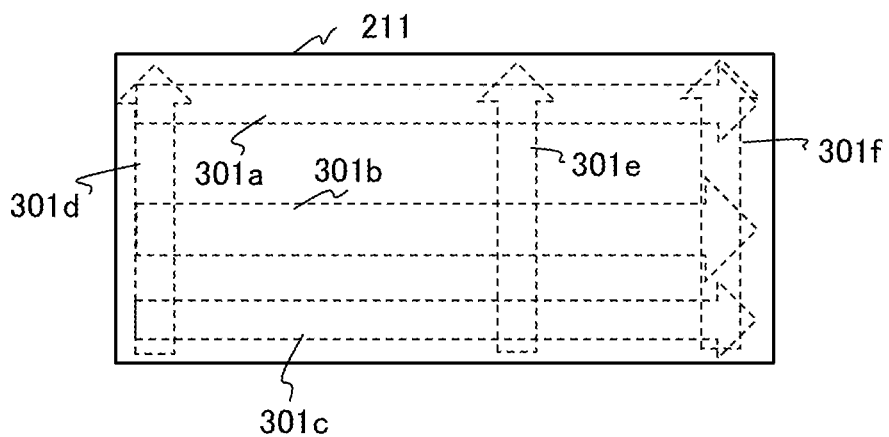
FIG. 4 is a diagram illustrating an example of an arrangement region that is set as a display region.

FIG. 4 illustrates one example of the plurality of arrangement regions 301*a* to 301*f* provided on the display regions 211. Note that, although not illustrated, one or a plurality of arrangement regions 301 may also be provided on the display region 221 of the second display 22 similarly to each of the display regions 211 of the first display 21.

The arrangement regions 301*a* to 301*f* are regions for arranging the display objects. Note that, in the drawings, positions of the arrangement regions 301*a* to 301*f* on the display regions 211 are indicated with broken lines, but the arrangement regions 301 are not actually displayed on the screen.

In the example in FIG. 4, the arrangement regions 301*a*, 301*b*, and 301*c* that extend in a transverse direction and the arrangement regions 301*d*, 301*e*, and 301*f* that extend in a vertical direction are provided on the display regions 211.

A virtual two-dimensional or three-dimensional coordination system independent from the x-y coordination system provided to the display screen of each of the first display 21 and the second display 22 is provided to the arrangement region 301. With this, display of the display objects on each of the arrangement regions 301 can be changed easily. When a two-dimensional coordination system is provided to the arrangement region 301, the arrangement region 301 has an area. When a three-dimensional coordination system is provided to the arrangement region 301, the arrangement region 301 has a volume.

The arrangement region 301 have axes (all of which are not illustrated) each having a direction (vector) extending from one end (start point) to the other end (end point) of the region (hereinafter, referred to as directional axes). The directional axes of the arrangement region 301 are not limited to linear lines parallel to the transverse direction or the vertical direction of the display regions 211, and may be linear lines in an oblique direction.

The arrangement region 301 each have a rectangular shape, for example. However, in the drawing, in order to indicate the directions of the directional axes of the arrangement region 301, the arrangement regions 301 are illustrated as arrow regions.

Hereinafter, a length parallel to the directional axis of the arrangement region 301 is referred to as a directional-axis length, and a length in a direction orthogonal to the directional axis of the arrangement region 301 is referred to as a width.

When a size of the display regions 211 is changed, the arrangement region 301 are changed in directional-axis lengths and positions while maintaining directions of directional axes and widths. However, the directions of the directional axes may be changed. A maximum value for the directional-axis lengths of the arrangement region 301 may be set so as to prevent unlimited extension in accordance with the increase in size of the display regions 211.

The arrangement regions 301 may be set to be visible or invisible as attribute information. A display object arranged in the arrangement region 301 set to be visible is displayed on the screen. In contrast, a display object arranged in the arrangement region 301 set to be invisible is not displayed on the screen.

As attribute information, the arrangement region 301 may be set to have priority relative to other arrangement regions 301 provided in the same display region 211. Note that, in the present embodiment, a higher value of priority indicates a higher priority order. Priority of the arrangement region 301 is set to to an initial value determined in advance by the priority setting unit 125. Priority of the arrangement region 301 may be changed in accordance with an operation from a user. Further, the priority setting unit 125 may learn a situation where change is made to priority, and may change priority dynamically in accordance with a learning result.

As attribute information, the arrangement region 301 may be set whether or not to be a target of weeding-out in a case where at least a part thereof overlaps with other arrangement regions 301 provided in the same display region 211. Here, the weeding-out indicates that attribute information relating to the arrangement region 301 with lower priority is changed from visible to invisible and a display object arranged in the arrangement region 301 having attribute information indicating invisible is removed from the screen. In the following description, "weeding-out" indicates an action of changing attribute information relating to the arrangement region 301 or the display object from visible to invisible and removing the region or the object from the screen.

For example, the arrangement regions 301 having the directional axes parallel to each other(for example, the arrangement region 301*a* and the arrangement region 301*b*) can be set as "targets to be weeded out" as attribute information, and the arrangement regions 301 having the directional axes intersecting each other (for example, the arrangement region 301*a* and the arrangement region 301*d*) can be set as "not targets to be weeded out".

Note that the shape of the arrangement region 301 is not limited to a rectangular shape, and may have other shapes. For example, the shape of the arrangement region 301 may be a circular shape, a ring shape, and the like, and may be defined through use of a linear function. Further, the width of the arrangement region 301 may be reduced extremely, and the shape of the arrangement region 301 may be defined as a substantial line.

<Attribute Information of Display Objects 302 Arranged in Arrangement Region 301>

Next, attribute information relating to the display objects 302 arranged in the arrangement region 301 is described. The display objects 302 arranged in the same arrangement region 301 and the display objects 302 arranged in the different arrangement regions 301 are displayed without being held in contact with each other or overlapping with each other, based on attribute information described below.

Figure 5:
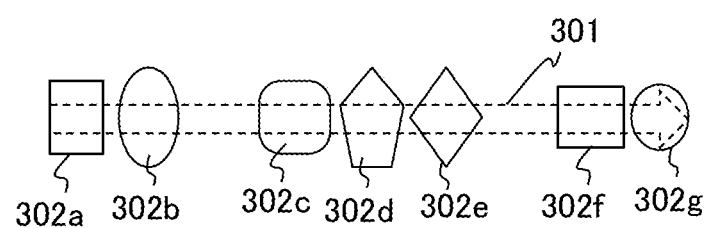
FIG. 5 is a diagram for describing attribute information relating to display objects (leading justification, center justification, or end justification).

FIG. 5 is a diagram for describing leading justification, center justification, and end justification that can be set as attribute information relating to the display objects 302a to 302f arranged in the arrangement region 301. However, when there is no need to distinguish the display objects 302a to 302f from each other individually, the display object 302 is simply referred to.

As attribute information, the display objects 302a to 302f arranged in the arrangement region 301 can be set with leading justification, center justification, or end justification.

In FIG. 5, as attribute information, the leading justification is set for the display objects 302a and 302b. The display objects 302a and 302b are displayed closely from a start point side of the arrangement region 301 (from the left side in the drawing).

As attribute information, the center justification is set for the display objects 302c to 302e. The display objects 302c to 302e are displayed closely at the center of the arrangement region 301.

As attribute information, the end justification is set for the display objects 302f and 302g. The display objects 302f and 302g are displayed closely from an end point of the arrangement region 301 (from the right side in the drawing).

Note that the display objects 302 that are set with leading justification, center justification, or end justification as attribute information are displayed at an equal interval with the adjacent display objects 302. In the example of the drawing, the plurality of display objects 302 arranged in the same arrangement region 301 are set to have different types of attribute information (leading justification, center justification, or end justification). However, the plurality of display objects 302 arranged in the same arrangement region 301 may be collectively set to the same attribute information (leading justification, center justification, or end justification).

Figure 6:
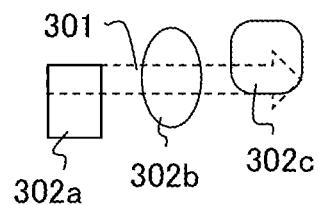
FIG. 6 is a diagram for describing attribute information relating to the display objects (upper alignment, center alignment, or lower alignment).

Next, FIG. 6 is a diagram for describing upper alignment, center alignment, and lower alignment that can be set as attribute information for the display objects 302a to 302c arranged in the arrangement region 301. However, when there is no need to distinguish the display objects 302a to 302c from each other individually, the display object 302 is simply referred to.

As attribute information, upper alignment, center alignment, or lower alignment can be set for the display objects 302a to 302c arranged in the arrangement region 301.

In FIG. 6, as attribute information, the upper alignment is set for the display object 302a. The display object 302a is displayed so as to have an upper end matching with an upper end of the arrangement region 301.

As attribute information, the center alignment is set for the display object 302b. The display object 302b is displayed so as to have a center matching with a center of the width of the arrangement region 301.

As attribute information, the lower alignment is set for the display object 302c. The display object 302c is displayed so as to have a lower end matching with a lower end of the arrangement region 301.

Note that, in the example of FIG. 6, the plurality of display objects 302 arranged in the same arrangement region 301 are set to have different types of attribute information (upper alignment, center alignment, or lower alignment). However, the plurality of display objects 302 arranged in the same arrangement region 301 may be collectively set to the same attribute information (upper alignment, center alignment, or lower alignment).

Figure 7:
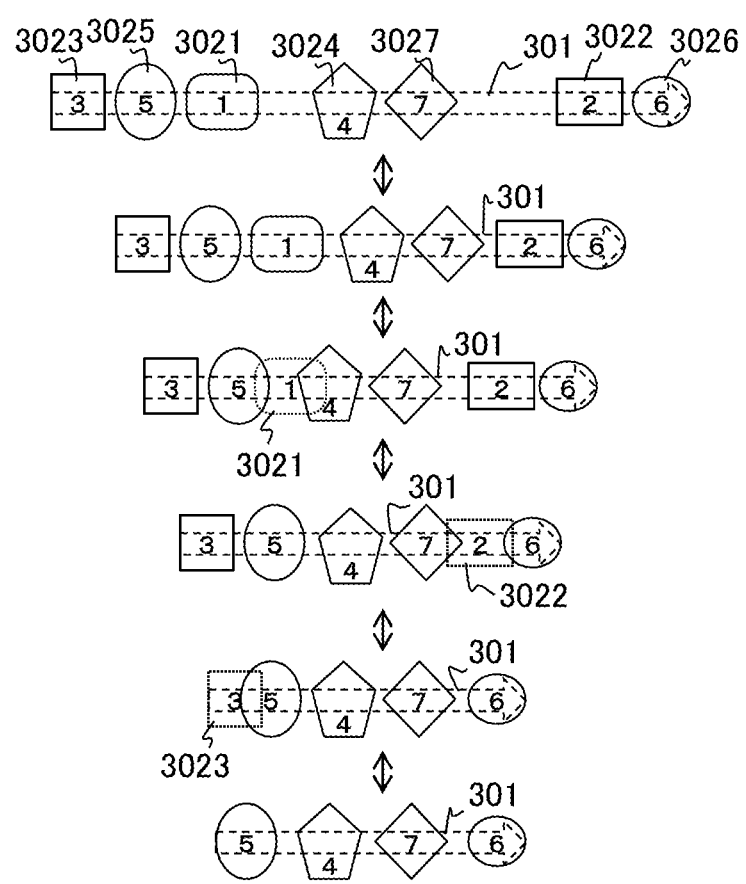
FIG. 7 is a diagram for describing attribute information relating to the display objects (priority, visible, or invisible).

Next, FIG. 7 is a diagram for describing priority and visible or invisible that are set as attribute information with respect to display objects 3021 to 3027 arranged in the arrangement region 301. However, when there is no need to distinguish the display objects 3021 to 3027 from each other individually, the display object 302 is simply referred to.

As attribute information, the plurality of display objects 302 arranged in the arrangement region 301 can be set to have priority relative to other display objects 302 arranged in the same arrangement region 301. Note that the plurality of display objects 302 arranged in the same arrangement region 301 may be set to have the same priority. In FIG. 7, numerals described for the display objects 302 are values indicating priority. In the following drawings, the same is applied. Regarding priority of the display objects 302, a higher value of priority indicates a higher priority order. As attribute information, the display objects 302 arranged in the arrangement region 301 are set to be visible or invisible.

In the example of FIG. 7, the display objects 3021 to 3027 each having a different priority are arranged in the arrangement region 301. Under a state illustrated in the uppermost row, attribute information relating to the display objects 3021 to 3027 is set as visible.

For example, when the directional-axis length of the arrangement region 301 is reduced in accordance with size change (downsizing) of the display region 211 (not illustrated) from the state illustrated in the uppermost row, the seven display objects 302 are displayed at a closer interval while maintaining the sizes as illustrated in the second row of FIG. 7.

Further, when the directional-axis length of the arrangement region 301 is further reduced so that the seven display objects 302 cannot be displayed at an interval as illustrated in the third row of FIG. 7, specifically, when an interval between the display objects 302 is less than a predetermined threshold value, the display object 3021 with the lowest priority among the seven display objects 302 is weeded out (attribute information is changed from visible to invisible). As a result, the six display objects 302 other than the weeded-out display object 3021 are displayed on the arrangement region 301.

Further, when the directional-axis length of the arrangement region 301 is further reduced so that the six display objects 302 cannot be displayed at an interval as illustrated in the fourth row of FIG. 7, the display object 3022 with the lowest priority among the six display objects 302 is weeded out (attribute information is changed from visible to invisible). As a result, the five display objects 302 other than the weeded-out display objects 3021 and 3022 are displayed on the arrangement region 301.

Similarly in the fifth and sixth rows of FIG. 7, when the directional-axis length of the arrangement region 301 is reduced, the display objects 3022 and 3023 are weeded out in the priority order from a lower priority side.

In contrast, when the directional-axis length of the arrangement region 301 is extended in accordance with size change (upsizing) of the display region 211 (not illustrated), display of the display objects 302 is changed from the lower row side to the upper row side of FIG. 7. That is, the weeded-out display objects 302 (ones having attribute information changed to invisible) are restored and displayed on the arrangement region 301 in the priority order from a higher priority (attribute information is changed to visible).

Note that relative priority among the plurality of display objects 302 arranged in the same arrangement region 301 is set to an initial value in advance, and may be changed by the priority setting unit 125 in accordance with an operation from a user. When the display objects 302 are HMIs such as operation reception buttons, the priority setting unit 125 may change priority in accordance with operation frequency from a user or set priority of the most recently operated object to the highest order.

Note that, in the example of FIG. 7, different priorities are set with respect to the plurality of display objects 302 arranged in the same arrangement region 301 as attribute information. However, the same priority may be set with respect to the plurality of display objects 302 arranged in the same arrangement region 301, and the display objects may be grouped.

For example, regarding the display objects illustrated in the first row of FIG. 7, a priority of the three display objects 302 set to leading justification may be set to 2, a priority of the two display objects 302 set to center justification may be set to 3, and a priority of the two display objects 302 set to end justification may be set to 1. Grouping may be performed accordingly. The plurality of display objects 302 arranged in the same arrangement region 301 are set to have the same priority and grouped. With this, a group of the display objects 302, which are meaningless when the objects are not displayed at the same time (for example, a pair of buttons for raising and lowering a setting temperature for air-conditioning, a pair of buttons for turning up and down a sound volume for audio, and the like) can be weeded out or restored at the same time.

Further, the priority setting unit 125 may dynamically change priority in accordance with a vehicle situation (traveling speed and the like). For example, priority of the display objects 302 as information windows for displaying a character string is lowered during traveling.

Moreover, for example, the priority setting unit 125 may learn a situation in which a user changes priority. At the time of a situation similar to the time when a user changes priority, the priority setting unit 125 may dynamically change priority in accordance with a learning result. With this, visibility of the display objects 302 for a user and operability of the display objects 302 being HMIs can be improved.

Figure 8:
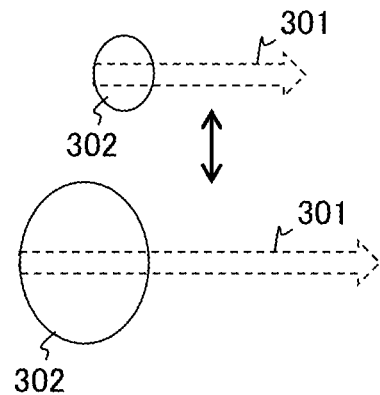
FIG. 8 is a diagram for describing attribute information relating to the display objects (region dependent upsizing).

Next, FIG. 8 is a diagram for describing region dependent upsizing that is set as attribute information with respect to the display objects 302 arranged in the arrangement region 301.

As attribute information, region dependent upsizing may be set for the display objects 302 arranged in the arrangement region 301. For example, in a case where the directional-axis length of the arrangement region 301 is extended from the state illustrated in the upper row of the drawing in accordance with upsizing of the display region 211 (not illustrated), the display object 302 set to region dependent upsizing as attribute information is upsized and displayed in proportional to extension of the directional-axis length of the arrangement region 301 as illustrated in the lower row of the drawing. However, the display object 302 may be set to have a maximum size.

Figure 9:
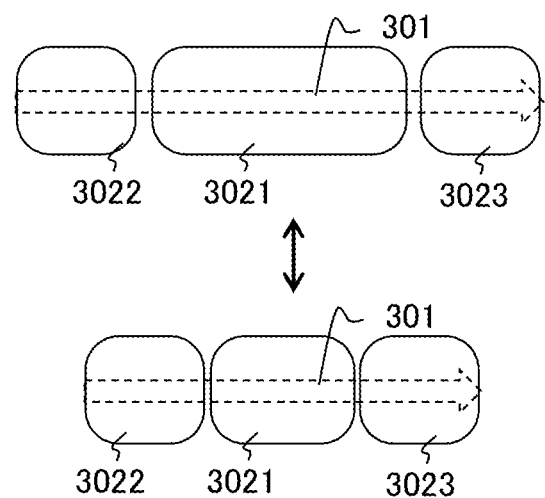
FIG. 9 is a diagram for describing attribute information relating to the display objects (region dependent downsizing).

Next, FIG. 9 is a diagram for describing region dependent downsizing that is set as attribute information with respect to the display objects 302 arranged in the arrangement region 301.

As attribute information, region dependent downsizing may be set for the display objects 302 arranged in the arrangement region 301. In the example of FIG. 9, priority is not set for the three display objects 3021 to 3023, and only the display objects 3021 is set with region dependent downsizing as attribute information.

For example, when the directional-axis length of the arrangement region 301 is reduced in accordance with downsizing of the display regions 211 (not illustrated) from the state illustrated in the upper row of FIG. 9, to be smaller than a total length of the widths of the three display objects 3021 to 3023, the directional-axis length of the arrangement region 301 is reduced and displayed so that the width of the display objects 3021 that is set with region dependent downsizing among the three display objects 3021 to 3023 do not overlap with the display objects 3022 and 3023, as illustrated in the lower row of FIG. 9. With this, the display objects 302 arranged in the arrangement region 301 can be displayed without being weeded-out while remaining the array order.

Figure 10:
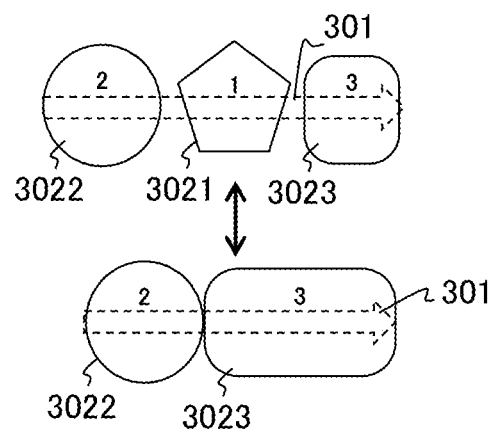
FIG. 10 is a diagram for describing attribute information relating to the display objects (margin extension).

Next, FIG. 10 is a diagram for describing margin extension that is set as attribute information with respect to the display objects 3021 to 3023 arranged in the arrangement region 301. However, when there is no need to distinguish the display objects 3021 to 3023 from each other individually, the display object 302 is simply referred to.

As attribute information, margin extension is set for the display objects 302 arranged in the arrangement region 301.

In the example of FIG. 10, among the display objects 3021 to 3023 having different priorities illustrated in the upper row, only the display object 3023 is set with margin extension as attribute information.

For example, when the directional-axis length of the arrangement region 301 is reduced from the state illustrated in the upper row of FIG. 10 in accordance with size change (downsizing) of the display region 211 (not illustrated) and the three display objects 3021 to 3023 cannot be displayed at an interval, specifically, when an interval between the display objects 302 is less than a predetermined threshold value, the display object 3021 with the lowest priority among the three display objects 3021 to 3023 is weeded-out (attribute information is changed to invisible), as illustrated in the lower row of FIG. 10. Further, a margin generated by weeding-out the display object 3021 is occupied by extending the width of the display object 3023 that is set with margin extension as attribute information. With this, a margin generated on the arrangement region 301 can be utilized efficiently.

In contrast, for example, the directional-axis length of the arrangement region 301 is extended from the state illustrated in the lower row of FIG. 10 in accordance with size change (upsizing) of the display region 211 (not illustrated) so that the three display objects 3021 to 3023 can be displayed at an interval, specifically, the interval between the display objects 302 is the predetermined threshold value or more, display of the display object 3021 is restored on the arrangement region 301 (attribute information is changed to visible), as illustrated in the upper row of FIG. 10.

Next, situation scaling as attribute information for changing display of the display objects 302 in accordance with a situation is described. Specifically, the display change of the display objects 302 in accordance with a situation indicates that, for example, display is performed in a downsizing manner so that a number of display objects 302 can be displayed at the same time while a vehicle is stopped or during automatic driving, and further indicates that, for example, the display objects 302 being HMIs are displayed in a upsizing manner when a traveling speed is high or a user is an aged person who is not good at detailed operation.

Figure 11:
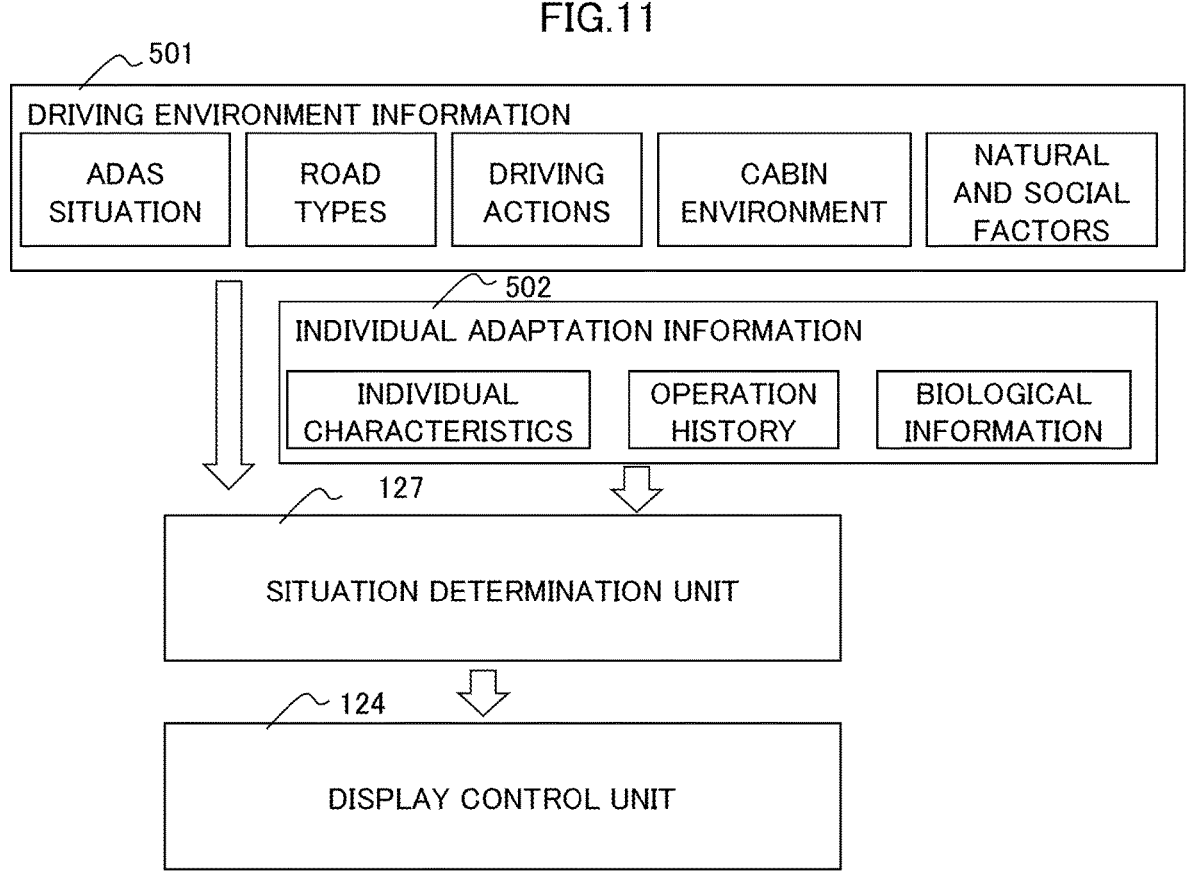
FIG. 11 is a diagram for describing a situation that causes display change of the display objects.

FIG. 11 is a diagram for describing a situation that causes display change of the display objects 302.

As a situation that causes display change of the display objects 302, the driving environment information 501 and the individual adaptation information 502 are assumed.

The driving environment information 501 includes an ADAS situation (indicating presence or absence of various types of advanced driving assist functions provided to a vehicle, a setting situation of activation or deactivation of such functions), road types (an expressway, a wide-area national route, a general road, a narrow city road, and the like), driving actions (a traveling speed, straight traveling, turning right or left, temporary stop, signal stop, and the like), cabin environment (a temperature, humidity, the number of passengers, and the like), and natural and social factors (seasons, weather, time range, traffic density, peripheral population density, and the like).

The individual adaptation information 502 includes individual characteristics (age, sex, driving history), operation capability (operation frequency, operation accuracy, and the like based on driving history and operation history), and biological information (a body temperature, a pulse, a respiration rate, a visual line, and the like).

The situation determination unit 127 determines whether to perform scaling of the display objects 302, based on at least one of the driving environment information 501 and the individual adaptation information 502. When scaling is performed, the situation determination unit 127 determines sizes of the display objects 302. Note that the sizes of the display objects 302 may be determined in a stepless manner in accordance with situation change, or may be determined by providing a plurality of steps. Further, the display control unit 124 follows the determination of the situation determination unit 127, and changes display of the display objects 302 on the display regions 211.

Figure 12:
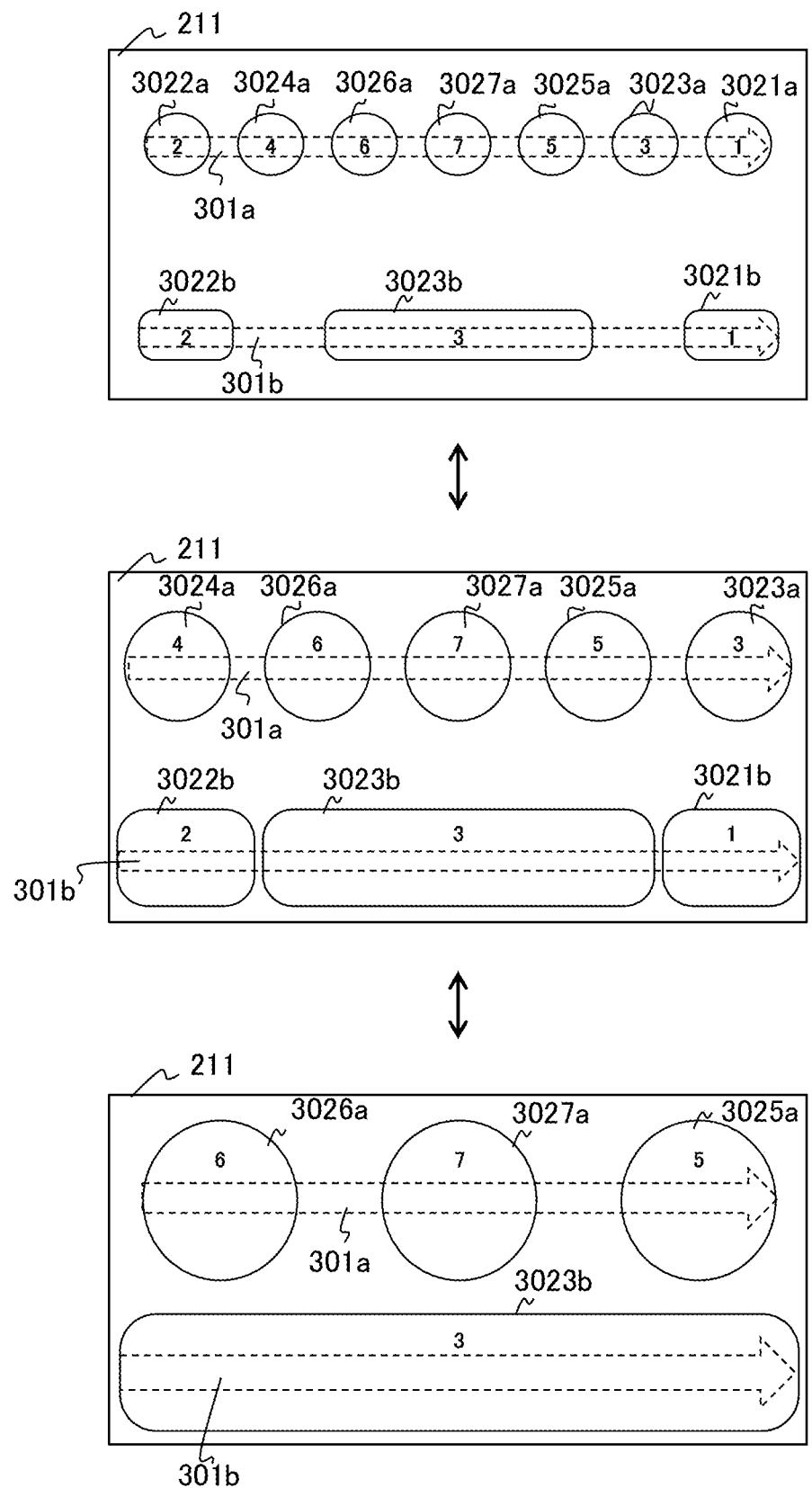
FIG. 12 is a diagram illustrating examples of display change of the display objects in accordance with a situation.
Figure 13:
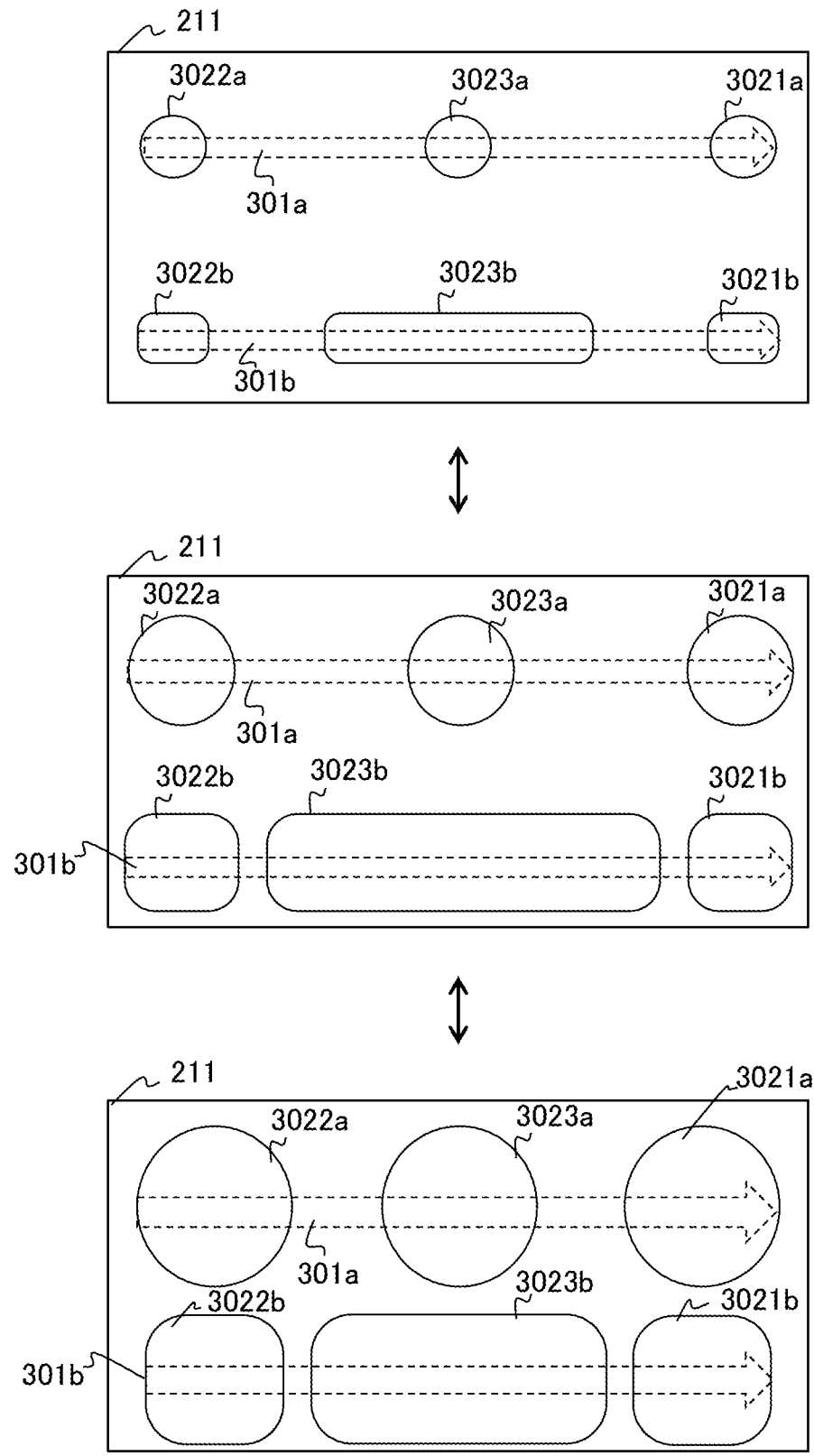
FIG. 13 is a diagram illustrating another example of display change of the display objects in accordance with a situation.

Next, FIG. 12 and FIG. 13 illustrate examples of display change of the display objects 302 in accordance with a situation.

In the examples of FIG. 12 and FIG. 13, display of the display objects 302 on the display region 211 on the first display 21 is changed in a case where a traveling speed differs as a situation. The upper row of the drawing illustrates a low traveling speed (or stoppage). The middle row of the drawing illustrates an intermediate traveling speed. The lower row of the drawing illustrates a high traveling speed. It is assumed that the size of the display region 211 illustrated in the upper row, the middle row, and the lower row of the drawing is not changed. Note that, in the examples in the drawings, the sizes of the display objects 302 are changed by three steps including large, middle, and small sizes in accordance with a traveling speed. However, the sizes of the display objects 302 may be changed by two steps, four steps or more, or more finely in a stepless manner.

In the case of FIG. 12, the display region 211 is provided with the arrangement region 301*a* and the arrangement region 301*b*, the seven display objects 3021*a* to 3027*a* having different priorities are arranged in the arrangement region 301*a*, and the three display objects 3021*b* to 3023*b* having different priorities are arranged in the arrangement region 301*b*. Note that, on the arrangement region 301*b*, the display object 3022*b* is set with leading justification, the display object 3023*b* is set with center justification, and the display object 3021*b* is set with end justification as attribute information. Further, the display objects 3021*a* to 3027*a* and the display objects 3021*b* to 3023*b* are set with situation scaling, as attribute information.

In a case of a low traveling speed (or stoppage), as illustrated in the upper row of FIG. 12, all the display objects 302 arranged in the arrangement region 301*a* and the arrangement region 301*b* are displayed in a small size on the display region 211.

In a case where a traveling speed is shifted from low to intermediate, as illustrated in the middle row of FIG. 12, the display objects 3021*a* to 3027*a* and the display objects 3021*b* to 3023*b* are upsized to a middle size because situation scaling as attribute information is set. In this case, on the arrangement region 301*a*, the seven display objects 3021*a* to 3027*a* upsized to a middle size cannot be displayed at an interval. Thus, the two display objects 3021*a* and 3022*a* with a lower priority are weeded out, and the remaining five display objects 3023*a* to 3027*a* are displayed in a middle size. On the arrangement region 301*b*, the three display objects 3021*b* to 3023*b* upsized to a middle size are displayed.

In a case where a traveling speed is shifted from intermediate to high, as illustrated in the lower row of FIG. 12, the display objects 3021*a* to 3027*a* and the display objects 3021*b* to 3023*b* are upsized to a large size. In this case, on the arrangement region 301*a*, the seven display objects 3021*a* to 3027*a* upsized to a large size cannot be displayed at an interval. Thus, the four display objects 3021*a* to 3024*a* with a lower priority are weeded out, and the three display objects 3025*a* to 3027*a* upsized to a large size are displayed. Similarly on the arrangement region 301*b*, the two display objects 3021*b* and 3022*b* with a lower priority are weeded out, and the display object 3023*b* upsized to a large size is displayed.

Note that, in contrast, in a case where a traveling speed is lowered, each of the display objects 302 is reduced in size, and display thereof is restored.

As a modification example of FIG. 12, instead of weeding out the display objects 302 in the priority order from a lower priority side, the widths of the display objects 302 may be reduced to a predetermined minimum size in the priority order from a lower priority side.

Next, in the case of FIG. 13, the display region 211 is provided with the arrangement region 301*a* and the arrangement region 301*b*, the three display objects 3021*a* to 3023*a* set to have the same priority are arranged in the arrangement region 301*a*, and the three display objects 3021*b* to 3023*b* set to have the same priority are arranged in the arrangement region 301*b*. Note that the display objects 3022*a* and 3022*b* are set with leading justification, the display objects 3023*a* and 3023*b* are set with center justification, and the display objects 3021*a* and 3021*b* are set with end justification as attribute information. Further, as attribute information, situation scaling is set for the display objects 3021*a* to 3023*a* and the display objects 3021*b* to 3023*b*. As attribute information, region dependent downsizing is set for the display object 3023*b*.

In a case of a low traveling speed (or stoppage), as illustrated in the upper row of FIG. 13, all the display objects 302 arranged in the arrangement region 301*a* and the arrangement region 301*b* are displayed in a small size on the display region 211.

In a case where a traveling speed is shifted from low to intermediate, as illustrated in the middle row of FIG. 13, the display objects 3021*a* to 3023*a* and the display objects 3021*b* to 3023*b* are upsized to have a middle size because situation scaling as attribute information is set. Also in this case, the three display objects 3021*a* to 3023*a* upsized to a middle size on the arrangement region 301*a* do not overlap with each other, and hence the three display objects 3021*a* to 3023*a* upsized to a middle size are displayed on the arrangement region 301*a*. Similarly on the arrangement region 301*b*, the three display objects 3021*b* to 3023*b* upsized to a middle size are displayed.

In a case where a traveling speed is shifted from intermediate to high, as illustrated in the lower row of FIG. 13, the display objects 3021*a* to 3023*a* and the display objects 3021*b* to 3023*b* are upsized to a large size. Also in this case, the positions of the three display objects 3021*a* to 3023*a* upsized to a large size on the arrangement region 301*a* do not overlap with each other, and hence the three display objects 3021*a* to 3023*a* upsized to a large size are displayed on the arrangement region 301*a*. Meanwhile, the three display objects 3021*b* to 3023*b* upsized to a large size cannot be displayed at an interval on the arrangement region 301*b*. Thus, the display object 3023*b* set to region dependent downsizing as attribute information is displayed by reducing a width in a large size, and the display objects 3021*b* and 3022*b* that are not set to region dependent downsizing are upsized to a large size and displayed.

Note that, similarly to scaling of the display objects 302 that are set with situation scaling as attribute information, in a case where the display objects 302 are upsized or downsized, one of a field angle changing method and a camera distance changing method or a combination of the field angle changing method and the camera distance changing method are used.

Figure 14A:
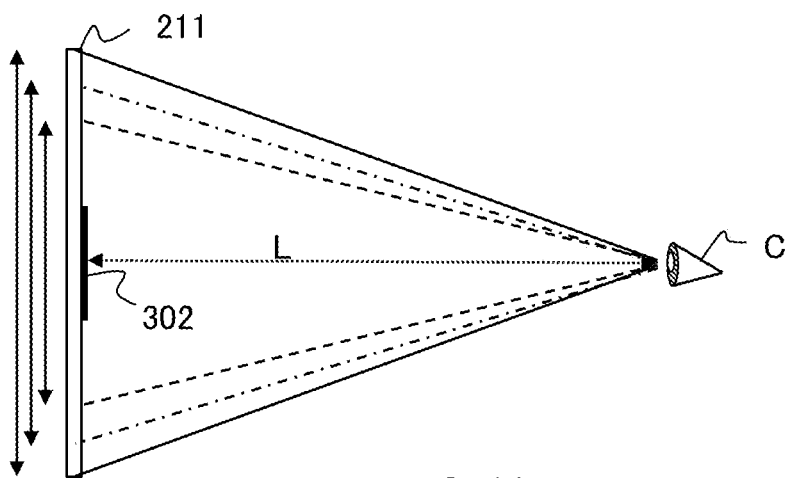
FIG. 14A and FIG. 14B are diagrams for illustrating scaling methods.
Figure 14B:
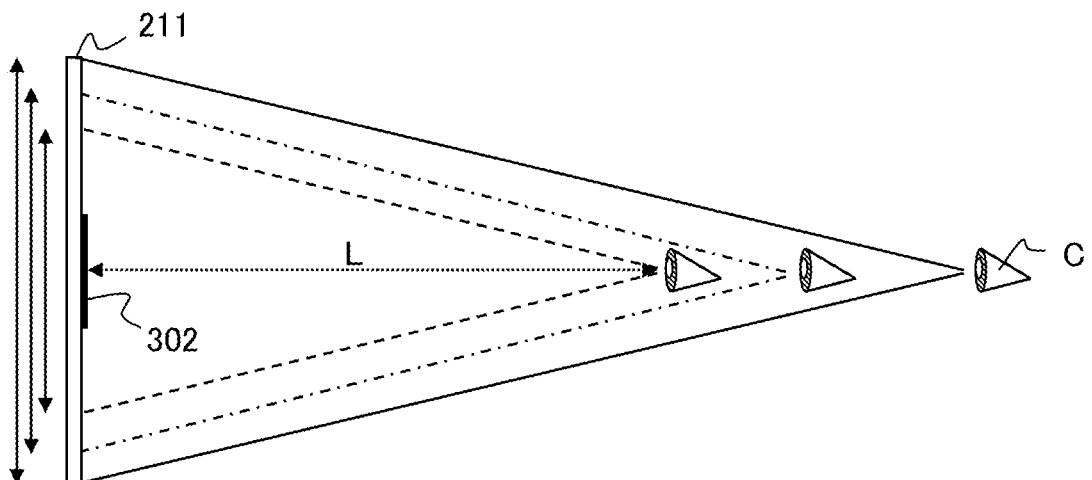

Next, FIG. 14 is a diagram for describing a scaling method for the display region 211 and the display object 302. FIG. 14A illustrates the field angle changing method, and FIG. 14B illustrates the camera distance changing method.

In the field angle changing method illustrated in FIG. 14A, a virtual camera C is fixed in front of the display region 211 for displaying the display object 302, at a position away therefrom by a distance L, and a field angle of the camera C is changed. In this manner, scaling of the display object 302 is performed. Specifically, when the display object 302 is upsized, the field angle of the camera C is narrowed. When the display object 302 is downsized, the field angle of the camera C is widened. In the case of the field angle changing method, for example, an effect of performing zooming-in through use of a telephoto lens and zooming-out through use of a wide angle lens can be obtained. In the case of the field angle changing method, distortion of the display object 302 due to perspective conversion can be suppressed as compared to the camera distance changing method.

In the camera distance changing method illustrated in FIG. 14B, the virtual camera C is arranged in front of the display region 211 for displaying the display object 302, and the distance L between the display regions 211 and the camera C is changed. In this manner, scaling of the display object 302 is performed. Specifically, when the display object 302 is upsized, the camera C is brought closer to the display region 211 so as to reduce the distance L. When the display object 302 is downsized, the camera C is away from the display region 211 so as to increase the distance L. In the case of the camera distance changing method, for example, an effect of giving a sense of actually seeing the display object 302 while being close to or away from the display object 302 can be obtained. In the case of the camera distance changing method, distortion of the display object 302 due to perspective conversion is conspicuous as compared to the field angle changing method. However, when the display object 302 is a three-dimensional object having a thickness, the distortion can express a three-dimensional effect more.

<Display of Display Objects 302 at Maximum Value of Display Region 211 Determined in accordance with Screen Size of First Display 21>

In the description given above, description is made on display change of the display objects 302 in the arrangement region 301 provided to the display regions 211 when the sizes of the display regions 211 of the first display 21 are dynamically changed in accordance with an operation from a user.

However, for example, in a case where the screen size of the first display 21 is small, even when one display region 211 is provided without dividing the display screen, let alone when the display screen is divided into plurality of regions to obtain the plurality of display regions 211, visibility and operability of the display objects 302 may be degraded in some cases.

In view of this, display of the display objects 302 at a maximum value of the display region 211 (hereinafter, referred to as a maximum display region 211M), which is determined in accordance with the screen size of the first display 21, is controlled.

Figure 15:
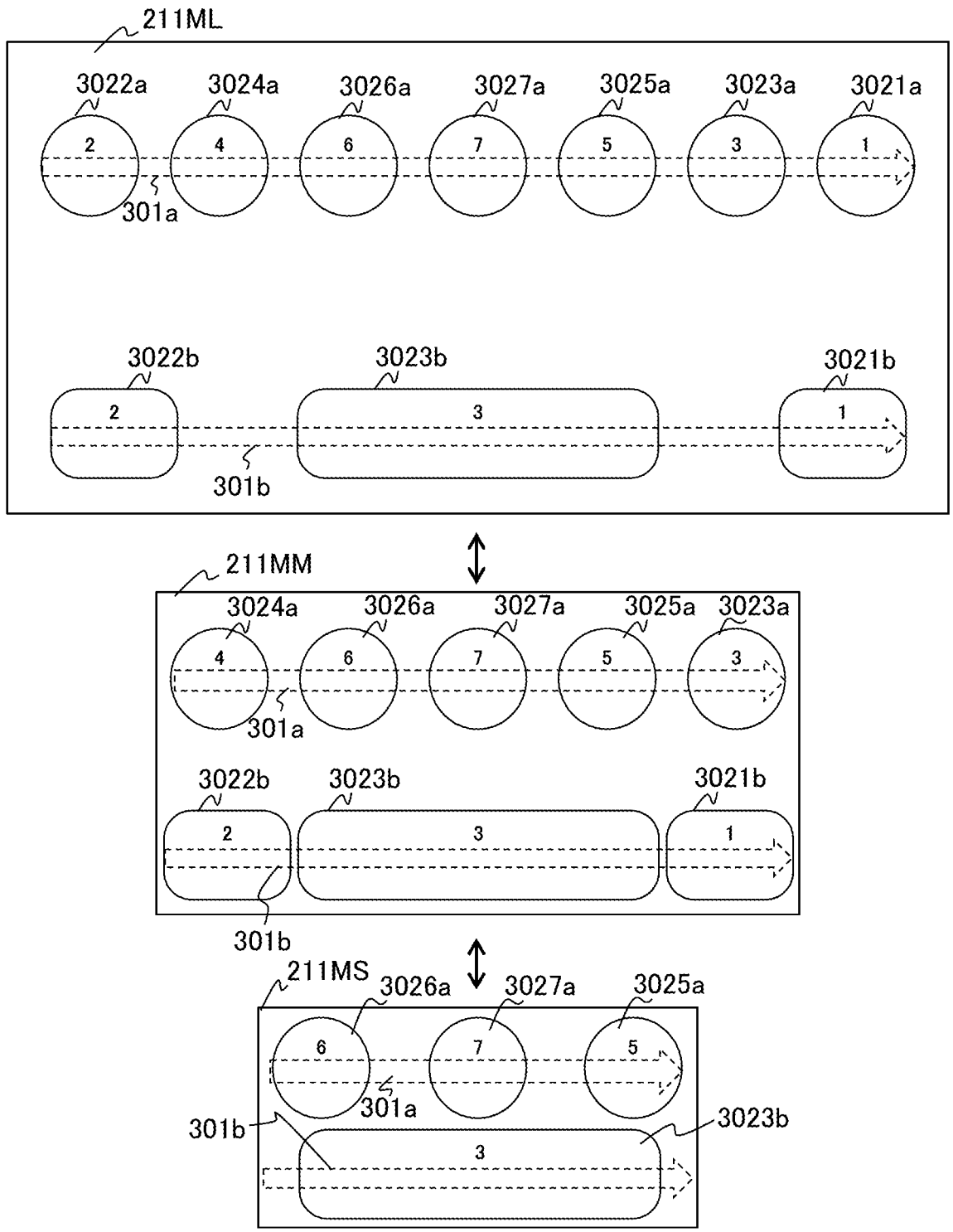
FIG. 15 is a diagram illustrating display examples of the display objects in maximum display regions in different screen sizes on the first display.

FIG. 15 illustrates display examples of the display objects 302 on the maximum display regions 211M having different screen sizes on the first display 21. The upper row of the drawing illustrates a case of a large screen (for example, 15 inches), the middle row of the drawing illustrates a case of a middle screen (for example, 13 inches), and the lower row of the drawing illustrates a case of a small screen (for example, 10 inches).

In the case of FIG. 15, the maximum display regions 211ML, 211MM, and 211MS are each provided with the arrangement region 301*a* and the arrangement region 301*b*. The seven display objects 3021*a* to 3027*a* having different priorities are arranged in the arrangement region 301*a*, and the three display objects 3021*b* to 3023*b* having different priorities are arranged in the arrangement region 301*b*. Note that, on the arrangement region 301*b*, the display object 3022*b* is set with leading justification, the display object 3023*b* is set with center justification, and the display object 3021*b* is set with end justification as attribute information.

In the case of the large screen illustrated in the upper row of FIG. 15, on the maximum display region 211ML, the directional-axis lengths of the arrangement region 301*a* and the arrangement region 301*b* are long enough to display all the display objects 302 arranged in the regions.

In the case of the middle screen illustrated in the middle row of FIG. 15, on the maximum display region 211MM, the directional-axis length of the arrangement region 301*a* is reduced, and not all the seven display objects 3021*a* to 3027*a* can be displayed as compared to the case of the large screen illustrated in the upper row of FIG. 15. Thus, the two display objects 3021*a* and 3022*a* with a lower priority are weeded out, and the remaining five display objects 3023*a* to 3027*a* are displayed. The three display objects 3021*b* to 3023*b* on the arrangement region 301*b* are displayed at a reduced interval.

In the case of the small screen illustrated in the lower row of FIG. 15, on the maximum display region 211MS, the directional-axis length of the arrangement region 301*a* is further reduced as compared to the middle screen illustrated in the middle row of FIG. 15, and not all the seven display objects 3021*a* to 3027*a* can be displayed. Thus, the four display objects 3021*a* and 3024*a* with a lower priority are weeded out, and the remaining three display objects 3025*a* to 3027*a* are displayed. Among the three display objects 3021*b* to 3023*b* on the arrangement region 301*b*, the two display objects 3021*b* and 3022*b* with a lower priority are weeded out, and the remaining display object 3023*b* is displayed.

In the display example illustrated in FIG. 15, when the screen size of the first display 21 differs, the display objects 302 can be weeded out in accordance with priority, and display can be performed without changing the size and layout of the display objects 302. Thus, operability on the first display 21 can be maintained.

Note that, as a modification example in a case of a small screen illustrated in the lower row of FIG. 15, instead of weeding out the display objects 3021b and 3022b in the priority order from a low degree side, the width of the display objects 302 may be reduced in the priority order from a low degree side.

Next, FIG. 16 illustrates other display examples of the display objects 302 on the maximum display regions 211M having different screen sizes on the first display 21. The upper row of the drawing illustrates a case of a large screen (for example, 15 inches), the middle row of the drawing illustrates a case of a middle screen (for example, 13 inches), and the lower row of the drawing illustrates a case of a small screen (for example, 10 inches).

In the case of FIG. 16, the maximum display regions 211ML, 211MM, and 211MS are each provided with the arrangement region 301a and the arrangement region 301b, the three display objects 3021a to 3023a set to have the same priority are arranged in the arrangement region 301a, and the three display objects 3021b to 3023b set to have the same priority are arranged in the arrangement region 301b. Note that the display objects 3022a and 3022b are set with leading justification, the display objects 3023a and 3023b are set with center justification, and the display objects 3021a and 3021b are set with end justification as attribute information. Further, as attribute information, region dependent downsizing is set for the display object 3023b.

In the case of the large screen illustrated in the upper row of FIG. 16, on the maximum display region 211ML, the directional-axis lengths of the arrangement region 301a and the arrangement region 301b are long enough to display all the display objects 302 arranged in the regions.

In the case of the middle screen illustrated in the middle row of FIG. 16, on the maximum display region 211MM, all the display objects 302 arranged in the arrangement region 301a and the arrangement region 301b are displayed. However, the directional-axis lengths of the arrangement region 301a and the arrangement region 301b are reduced as compared to the case of the large screen illustrated in the upper row of FIG. 16. Thus, the three display objects 3021a to 3023a on the arrangement region 301a and the three display objects 3021b to 3023b on the arrangement region 301b are displayed at a reduced interval.

In the case of the small screen illustrated in the lower row of FIG. 16, on the maximum display region 211MS, all the display objects 302 arranged in the arrangement region 301a and the arrangement region 301b are displayed. However, the directional-axis lengths of the arrangement region 301a and the arrangement region 301b are further reduced as compared to the case of the middle screen illustrated in the middle row of FIG. 16. Thus, the three display objects 3021a to 3023a on the arrangement region 301a are displayed at a further reduced interval. Unless the sizes are changed, the three display objects 3021b to 3023b on the arrangement region 301b cannot be displayed at an interval even when the interval is reduced. The width of the display object 3023b set with region dependent downsizing as attribute information is reduced, and the display objects 3021b and 3022b are displayed without size change.

In the example illustrated in FIG. 16, when the screen size of the first display 21 differs, display can be performed without weeding out the display objects 302 and changing the sizes and layout of the display objects 302. Thus, operability on the first display 21 can be maintained.

<Display Control Processing Performed by Onboard Device 10>

Next, description is given on display control processing in consideration of a difference in screen size of the first display and display change in accordance with a situation of the display objects 302 set to situation scaling as attribute information.

Figure 17:
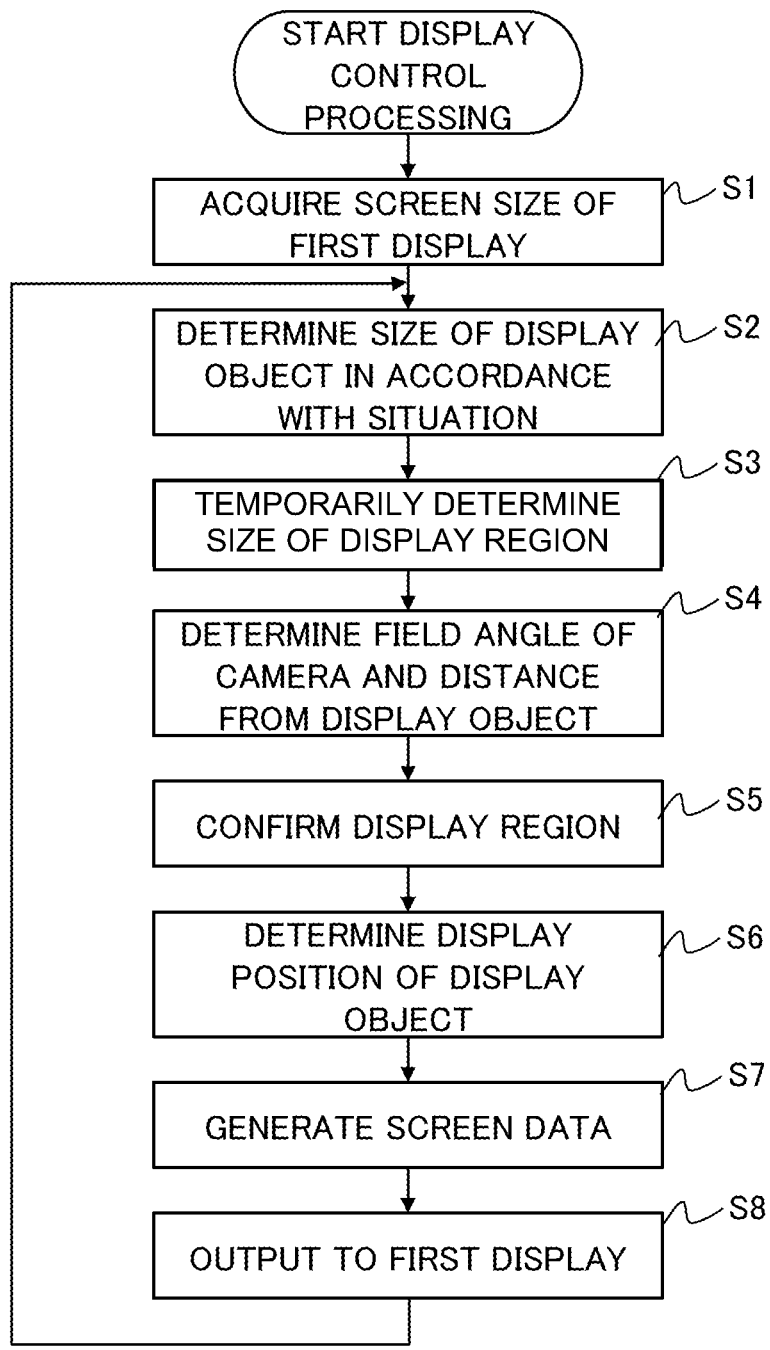
FIG. 17 is a flowchart illustrating one example of display control processing performed by an onboard device 10.

FIG. 17 is a flowchart illustrating one example of the display control processing performed by the onboard device 10.

The display control processing is started after activation of the onboard device 10, and is continuously executed until an operation of the onboard device 10 is completed.

First, the display region setting unit 123 acquires the screen size of the first display 21, and specifies the maximum display region 211M in accordance with the screen size (Step S1). Note that the screen size of the first display 21 may be acquired directly from the first display 21, or hardware information stored in the storage unit 130 may be referred to.

Next, the situation determination unit 127 determines whether to perform scaling of the display objects in accordance with a situation of a vehicle or a driver (a user) based on the driving environment information 501 and the individual adaptation information 502, and determines sizes of the display objects 302 in a case where scaling is performed (Step S2).

Next, the display region setting unit 123 temporarily determines a size of the display region 211 based on a correlation between the maximum display region 211M provided to the first display 21, which is specified in Step S1 and the display objects 302 determines in Step S2 (Step S3).

Next, through use of at least one of the field angle changing method and the camera distance changing method, the display control unit 124 determines the field angle of the virtual camera C (FIG. 14) and the distance L between the camera C and the display objects 302 so as to achieve the size of the display region 211 determined in Step S3 (Step S4).

Next, by following the field angle of the camera C and the distance L between the camera C and the display objects 302 determined in Step S4, the display region setting unit 123 corrects the display region 211 that is temporarily determined, as appropriate, and confirms the size of the display region 211 (Step S5).

Next, the display control unit 124 determines display positions of the display objects 302 on the display region 211, based on attribute information such as priority set with respect to the display objects 302 (Step S6). Next, the display control unit 124 generates image data for causing the first display 21 to display the display region 211 in which the display objects 302 are arranged (Step S7).

Finally, the display control unit 124 outputs the generated image data to the first display 21 (Step S8). With this, on the first display 21, the display region 211 with the display objects 302 subjected to scaling in accordance with a situation is displayed. After that, the processing returns to Step S3, and is repeated from Step S3 to Step S8.

With the display control processing described above, the sizes of the display objects 302 on the display region 211 may be dynamically changed in accordance with a situation. Therefore, screen display excellent in visibility and operability for a user can be achieved.

Note that the display control processing performed by the onboard device 10, which is described above, can be executed without depending on an aspect ratio or a resolution of the first display 21.

<Modification of Arrangement Region 301 in Accordance with Situation Change>

Next, modification of the arrangement region 301 in accordance with change of a situation is described.

As described above, when the size of the display region 211 is changed, the arrangement region 301 is changed in a directional-axis length and a position while maintaining the direction of the directional axis and width.

Further, the arrangement region 301 may be modified in accordance with situation change. Specifically, modification may be made in a two-dimensional coordination system of the arrangement region 301, which is parallel to a coordination system of the display screen and independent from the coordination system of the display screen, or modification may be made in a coordination system in three or more dimension of the arrangement region 301, which is independent from the coordination system of the display screen.

Figure 18:
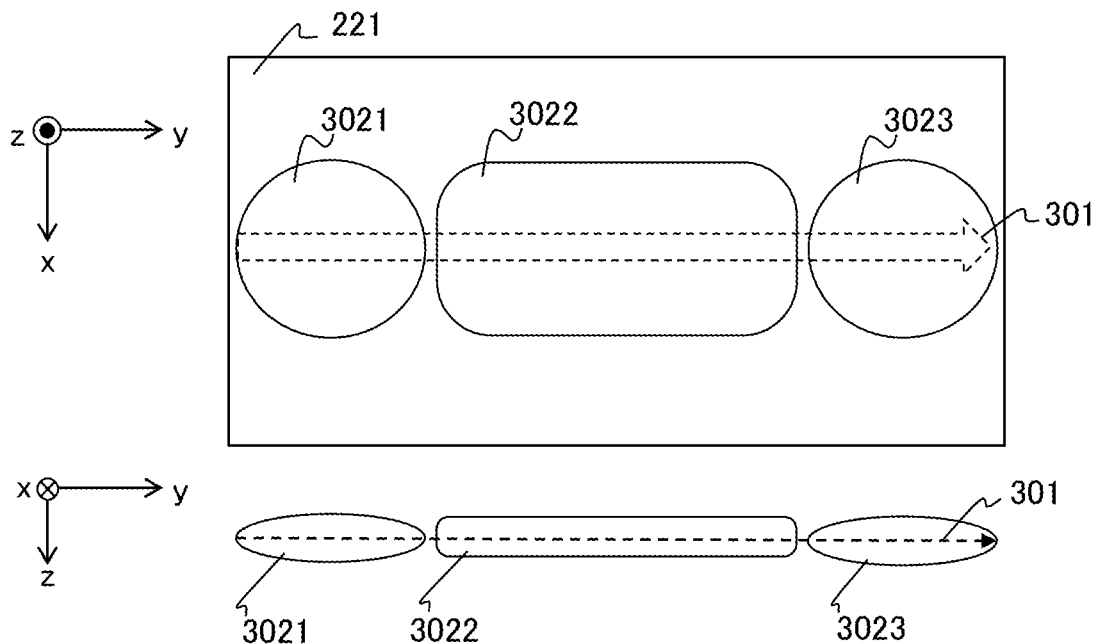
FIG. 18 is a diagram illustrating a state before modification of the arrangement region in accordance with change of a situation.

FIG. 18 illustrates a modification example being a state before modification in accordance with situation change of the arrangement region 301 provided to the display region 221 of the second display 22. FIG. 19 to FIG. 22 illustrate the modification example being a state after modification in accordance with situation change of the arrangement region 301 provided to the display region 221 of the second display 22.

Note that a virtual three-dimensional xyz coordination system as illustrated is assumed with respect to the arrangement region 301. Further, on the display region 221 of the second display 22, a state in which the arrangement region 301 having the virtual three-dimensional xyz coordination system is subjected to perspective conversion into the display region 221 having a two-dimensional x-y coordination system is displayed.

As illustrated in FIG. 18, the arrangement region 301 is in a state parallel to the display screen (xy plane) before modification. Further, when a situation is changed, in the modification example illustrated in FIG. 19, the width of the display object 3022 is upsized in order to increase an information amount of the display object 3022 arranged at the center of the arrangement region 301, and both ends of the arrangement region 301 on which the display objects 3021 and 3023 other than the upsized display object 3022 are arranged are in a folded state in a direction orthogonal to the display screen (xy plane) (+z direction). Further, the display objects 3021 and 3023 arranged in the folded parts of the arrangement region 301 are displayed in an obliquely-viewed shape on the display region 221. Meanwhile, the display object 3022 arranged at the non-folded portion of the arrangement region 301 is displayed on the display region 221 while maintaining a shape viewed from the front and being upsized in the lateral direction (y direction).

As a result, visibility of the display objects 3021 and 3023 arranged at both the ends of the arrangement region 301 is degraded, but the display object 3022 arranged at the center of the arrangement region 301 can have an increased information amount and improved visibility.

Note that, as situation change that modifies the arrangement region 301, for example, switching from driving performed by a driver himself or herself to automatic driving can be given. In this case, as the display objects 3021 and 3023 that degrades visibility during automatic driving, for example, a speed meter and a tachometer are assumed. As the display object 3022 having an increased information amount during automatic driving, an information display window for displaying various types of information such as news information, navigation information, and sightseeing information relating to a target place is conceivable.

However, situation change that modifies the arrangement region 301 is not limited to switching to automatic driving. For example, the arrangement region 301 may be modified in accordance with change in traveling speed.

Figure 19:
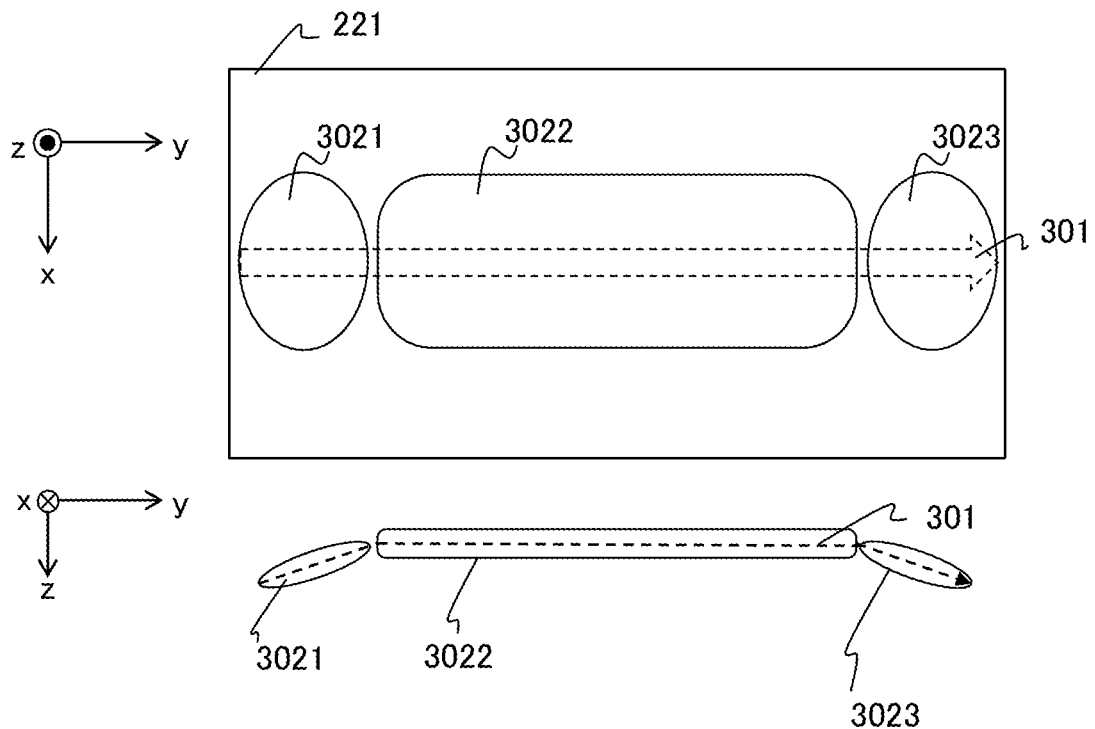
FIG. 19 is a diagram illustrating a state after modification of the arrangement region in accordance with change of a situation.

The modification example of the arrangement region 301 is not limited to the example illustrated in FIG. 19. For example, only one end of the both ends of the arrangement region 301 may be folded. Further, for example, an end of the arrangement region 301 may be folded in a −z direction.

Figure 20:
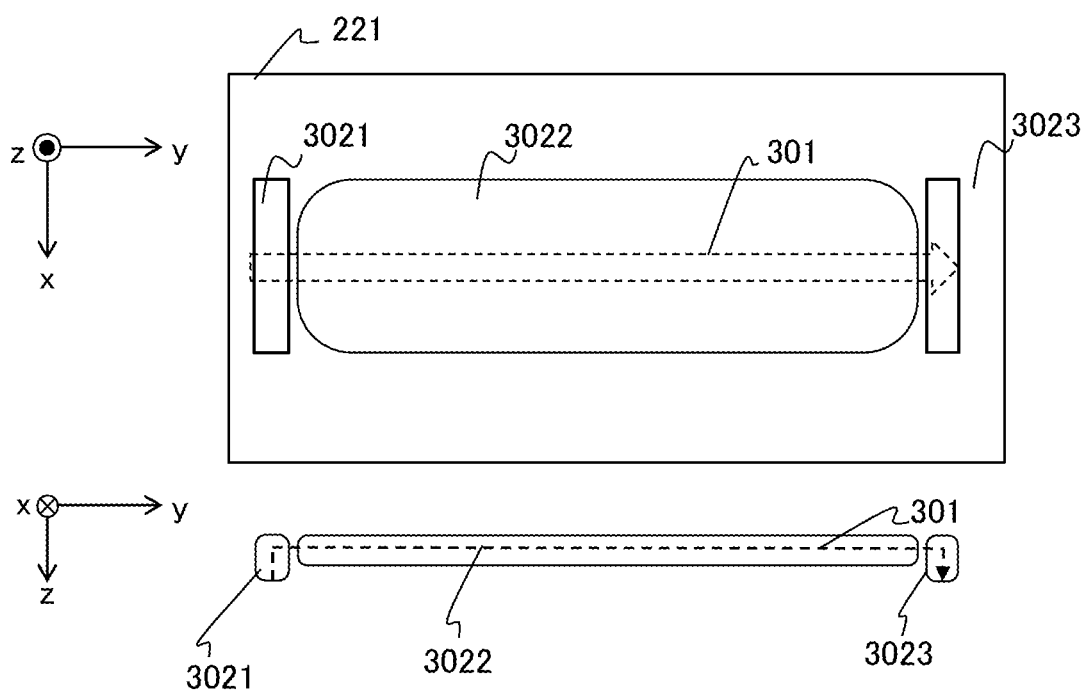
FIG. 20 is a diagram illustrating a state after modification of the arrangement region in accordance with change of a situation.

Further, as illustrated in FIG. 20, an end of the arrangement region 301 may be folded in the +z direction or the −z direction at approximately 90 degrees so that side surfaces of the display objects 3021 and 3023 are visually recognized. Further, on each of the side surfaces of the display objects 3021 and 3023, the substantially same information as the information displayed on the front surface may be displayed in a different form. For example, when the display objects 3021 and 3023 are a speed meter and a tachometer, an analog meter indicating a speed or the like with a rotating pointer may be displayed on each of the front surfaces, and a digital meter indicating a speed or the like with a numeral value, a bar chart, or the like may be displayed on each of the side surfaces. Note that the display objects 3021 and 3023 may not be provided with a thickness in the z direction so that the display objects 3021 and 3023 are substantially invisible.

Figure 21:
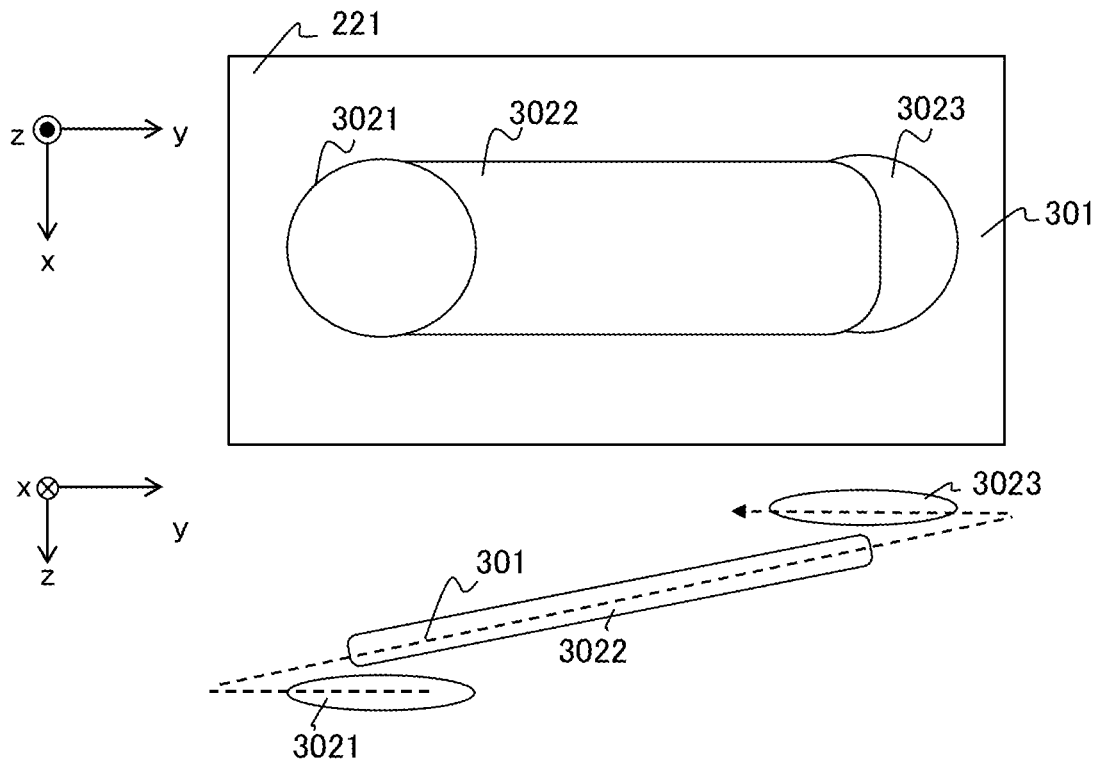
FIG. 21 is a diagram illustrating a state after modification of the arrangement region in accordance with change of a situation.

Moreover, the arrangement region 301 may be modified by being folded to have depth in the z direction. FIG. 21 illustrates a modification example in which the arrangement region 301 is folded in a Z-like shape with depth in the z direction. In this case, the display objects 3021 to 3023 are displayed on the display region 221 under a state of overlapping in the z direction.

As a result, the display objects 3022 and 3023 are partially hidden, but the display objects 3021 to 3023 can be displayed in the original size. Note that modification may be made so that the three liner lines indicating the arrangement region 301 after modification are parallel to one another.

Figure 22:
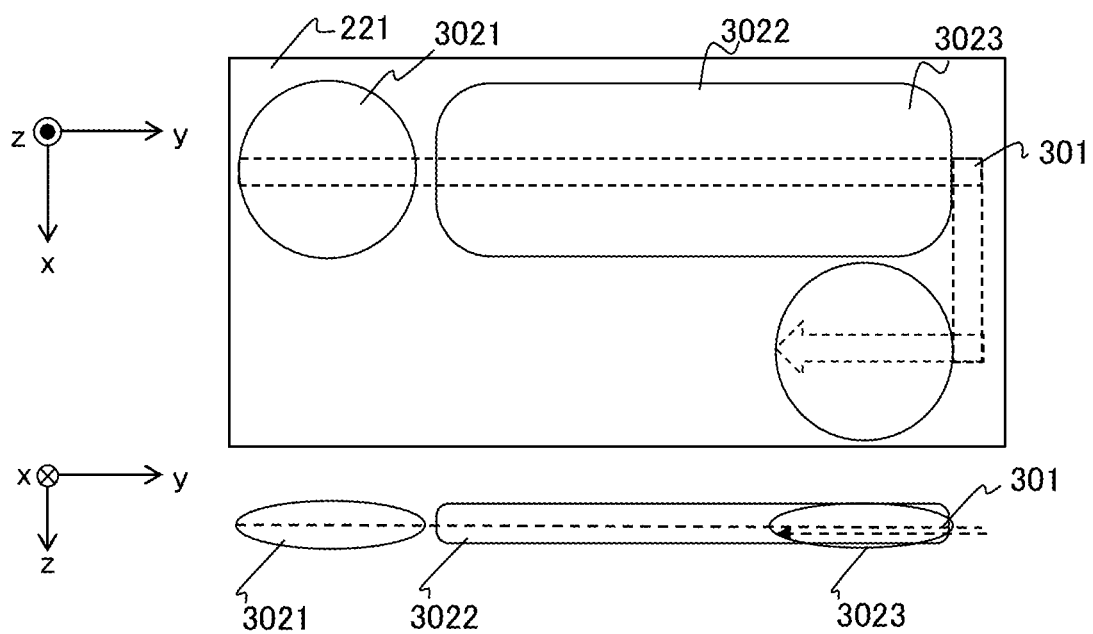
FIG. 22 is a diagram illustrating a state after modification of the arrangement region in accordance with change of a situation.

Next, FIG. 22 illustrates a modification example in which the arrangement region 301 is folded in a U-like shape in the xy plane parallel to the display region 221. In this case, the display objects 3021 to 3023 displayed in one row are displayed in two separate rows.

Further, modification of the arrangement region 301 in accordance with situation change may be performed not only on the display region 221 of the second display 22 but also on the display region 211 of the first display 21.

Moreover, modification of the arrangement region 301 illustrated in FIG. 19 is applied to the display example of FIG. 12, and the sizes of the display objects 3021b to 3023b are upsized as the modification example in the lower row of FIG. 12. As a result, when an interval between the display objects 3021b to 3023b is less than a predetermined threshold value, the arrangement region 301b may be folded so that the display objects are displayed in an obliquely-viewed shape in the priority order from a lower priority side. In other words, instead of weeding out the two display objects 3021b and 3022b with a lower priority on the arrangement region 301b, both the ends of the arrangement region 301b may be folded to display the display objects 3021b and 3022b in an obliquely-viewed shape, and the display object 3023b upsized to a large size may be displayed in a shape viewed from the front.

Note that, in the embodiment described above, description is given on change of display of the plurality of display objects 302 arranged in the horizontally-long arrangement region 301. However, with regard to the plurality of display objects 302 arranged in a vertically-long arrangement region 301, display thereof can be changed similarly.

Incidentally, the present invention is applicable to a case where, for example, a screen is obtained with a projector through screen projection in addition to a case where a screen is displayed on the displays (the first display 21 and the second display 22) as in the present embodiment.

The effects described in the present specification are merely examples, and are not limited thereto. Other effects may be exerted.

The present invention is not limited to the embodiment described above, and includes various modification examples. For example, the embodiments described above are described in detail for the sake of easier understanding of the present invention, and the present invention is not necessarily limited to including all the configurations described herein. It is possible to replace a part of a configuration of one embodiment with a configuration of another embodiment. It is also possible to add a configuration of one embodiment to a configuration of another embodiment. Another configuration can be added to, deleted from, and replaced with a part of a configuration of each embodiment.

A part of or an entirety of the configurations, functions, processing units, processing means, and the like described above may be implemented by hardware by designing those with, for example, integrated circuits or the like. Each of the configurations, functions and the like described above may be implemented by software by a processor that interprets and executes programs for achieving each function. Information for achieving each of the functions, such as a program, a determination table, and a file may be placed in a storage device such as a memory, an HDD, and an SSD, and a recording medium such as an IC card, an SD card, and a DVD. Illustrations of control lines and information lines are those considered to be necessary for the sake of description, and not necessarily include all the control lines and information lines necessary as a product. In actuality, it may be considered that almost all the configurations are connected to each other.

In addition to the display control device and the display control method, the present invention may be provided in various forms such as a computer-readable program.

What is claimed is:

1. A display control device comprising:
a memory;
an input/output device; and
a processor communicatively coupled to the memory and the input/output device, the processor is configured to
set an arrangement region on a virtual three-or-more-dimensional coordination system and control display of a display by displaying a perspectively converted image of one or more display objects arranged in the arrangement region, on a display region of the display having a two-dimensional coordination system, the arrangement region having a virtual three-or-more-dimensional coordination system;
determine at least one situation of environment and a user; and
change at least one of a size of the arrangement region and a shape of the arrangement region on the virtual three-or-more-dimensional coordination system in accordance with change of the situation.

2. The display control device according to claim 1, wherein
the processor folds the arrangement region in a direction orthogonal to a display screen of the display in accordance with the change of the situation.

3. The display control device according to claim 2, wherein
the processor folds at least one of both ends of the arrangement region in a direction orthogonal to a display screen of the display in accordance with change of the situation.

4. The display control device according to claim 2, wherein
the processor displays the display objects in an obliquely-viewed shape, the one or more display objects being arranged at a folded portion of the arrangement region.

5. The display control device according to claim 2, wherein
the processor displays a side surface of at least one of the one or more display objects arranged at a folded portion of the arrangement region.

6. The display control device according to claim 5, wherein
the processor displays information on the side surface of at least one of the one or more display objects arranged at the folded portion of the arrangement region, the information being different from information displayed on a front surface of corresponding display object.

7. The display control device according to claim 2, wherein
the processor displays the one or more display objects in a shape viewed from the front, the one or more display objects being arranged at a non-folded portion of the arrangement region.

8. The display control device according to claim 2, wherein
the processor displays, in an upsizing manner, the one or more display objects arranged at a non-folded portion of the arrangement region.

9. The display control device according to claim 1, wherein the processor is further configured to
set relative priority among the display objects provided to the same arrangement region, and
in a case where the processor upsizes a size of the one or more display objects in accordance with the change of the situation, and as a result of upsizing of the display objects, an interval between the display objects is less than a predetermined threshold value, the processor modifies the arrangement region to change display of the display objects in accordance with the priority.

10. The display control device according to claim 1, wherein
the processor modifies the arrangement region on a plane parallel to a display screen of the display in accordance with change of the situation.

11. The display control device according to claim 1, wherein
the arrangement region is set as one of visible or invisible in the arrangement region.

12. The display control device according to claim 1, wherein
each of the one or more display images is set as one of visible or invisible in the arrangement region.

13. A display control method performed by a display control device, the display control display control method comprising:
setting an arrangement region on a virtual three-or-more-dimensional coordination system and controlling display of a display by displaying a perspectively converted image of one or more display objects arranged in the arrangement region, on a display region of the display having a two-dimensional coordination system, the arrangement region having a virtual three-or-more-dimensional coordination system; and determining at least one situation of environment and a user, wherein at least one of a size of the arrangement region and a shape of the arrangement region is changed on the virtual three-or-more-dimensional coordination system in accordance with change of the situation.

14. The display control method according to claim 13, wherein the arrangement region is set as one of visible or invisible in the arrangement region.

15. The display control method according to claim 13, wherein each of the one or more display images is set as one of visible or invisible in the arrangement region.

\* \* \* \* \*